(12) United States Patent
Baird et al.

(10) Patent No.: US 12,443,575 B1
(45) Date of Patent: Oct. 14, 2025

(54) SYSTEMS AND METHODS FOR VALIDATION OF DATA ENTRIES FOR USER INTERFACE DATA SETS

(71) Applicant: JASE MEDICAL L.L.C., Salt Lake City, UT (US)

(72) Inventors: John Knapp Baird, Salt Lake City, UT (US); Jonathan Hanks Baird, Alpine, UT (US); Shawn Rowland, Waialua, HI (US); Erik Rowland, Heber City, UT (US)

(73) Assignee: JASE MEDICAL L.L.C., Salt Lake City, UT (US)

( * ) Notice: Subject to any disclaimer, the term of this patent is extended or adjusted under 35 U.S.C. 154(b) by 0 days.

(21) Appl. No.: 18/990,894

(22) Filed: Dec. 20, 2024

(51) Int. Cl.
  *G06F 16/00* (2019.01)
  *G06F 16/215* (2019.01)
  *G06F 16/2455* (2019.01)
  *G06F 16/29* (2019.01)

(52) U.S. Cl.
  CPC ...... *G06F 16/215* (2019.01); *G06F 16/24565* (2019.01); *G06F 16/29* (2019.01)

(58) Field of Classification Search
  None
  See application file for complete search history.

(56) References Cited

U.S. PATENT DOCUMENTS

| | | | |
|---|---|---|---|
| 6,654,932 B1* | 11/2003 | Bahrs | G06F 8/38 |
| | | | 715/764 |
| 11,398,312 B2 | 7/2022 | Todd et al. | |
| 2017/0046500 A1 | 2/2017 | Lindsay | |
| 2020/0322320 A1* | 10/2020 | Moon | G06F 21/40 |
| 2023/0010339 A1* | 1/2023 | Lamacchia | H04L 9/3247 |
| 2023/0122851 A1* | 4/2023 | Urness | G16H 40/67 |
| | | | 707/692 |

FOREIGN PATENT DOCUMENTS

| | | | | |
|---|---|---|---|---|
| CN | 109841268 A | 6/2019 | | |
| CN | 112133416 A | 12/2020 | | |
| WO | WO-2012095867 A2 * | 7/2012 | | G01S 3/7864 |

* cited by examiner

*Primary Examiner* — Bai D Vu
(74) *Attorney, Agent, or Firm* — Caldwell Intellectual Property Law

(57) ABSTRACT

A system for validation of data entries for user interface data sets, the system including a computing device configured to receive an identification data set including a plurality of data entries, validate at least one data entry, generate at least one data request as a function of the validation, receive at least one data response as a function of the at least one data request, receive from a validation database, a target data set as a function of the identification data set and the at least one data response, construct a user interface structure as a function of the target data set and configure the first remote device to generate a graphical view as a function of the user interface data structure, wherein the graphical view includes one or more selectable event graphics corresponding to one or more selectable event handlers.

20 Claims, 9 Drawing Sheets

CONTACT INFO
Name as it appears on your government issued ID

Email

Date of Birth

Verify

FIG. 2A

SYSTEMS AND METHODS FOR VALIDATION OF DATA ENTRIES FOR USER INTERFACE DATA SETS

FIELD OF THE INVENTION

The present invention generally relates to the field of user interface validation. In particular, the present invention is directed to systems and methods for validation of data entries for user interface data sets.

BACKGROUND

Current systems used to validate entries displayed through a graphical user interface are often static and do not allow for the display of dynamic content. In addition, current user interfaces lack the structure to allow for proper user interaction.

SUMMARY OF THE DISCLOSURE

In an aspect, a system for validation of data entries for user interface data sets, the system including at least a processor and a memory communicatively connected to the at least a processor. The memory contains instructions configuring the at least a processor to receive an identification data set including a plurality of data entries from a first remote device, validate at least one data entry of the plurality of data entries by comparing the identification data set to at least one encrypted datum, generate at least one data request as a function of the validation and receive from the first device, at least one data response as a function of the at least one data request. The processor is further configured to receive from a validation database, a target data set as a function of the identification data set and the at least one data response, construct a user interface structure as a function of the target data set and configure the first remote device to generate a graphical view as a function of the user interface data structure, wherein the graphical view includes one or more selectable event graphics corresponding to one or more selectable event handlers, wherein each selectable event handler is configured to trigger at least one event action upon interaction of the selectable event graphic and wherein each selectable event handler is associated with at least one target datum within the target data set.

In another aspect, a method for validation of data entries for user interface data sets, the method including receiving, by at least a processor, an identification data set including a plurality of data entries from a first remote device, validating, by the at least a processor, at least one data entry of the plurality of data entries by comparing the identification data set to at least one encrypted datum, generating, by the at least a processor, at least one data request as a function of the validation and receiving, by the at least a processor and from the first device, at least one data response as a function of the at least one data request. The method includes receiving, by the at least a processor, from a validation database, a target data set as a function of the identification data set and the at least one data response, constructing, by the at least a processor, a user interface structure as a function of the target data set, and configuring, by the at least a processor, the first remote device to generate a graphical view as a function of the user interface data structure, wherein the graphical view includes one or more selectable event graphics corresponding to one or more selectable event handlers, wherein each selectable event handler is configured to trigger at least one event action upon interaction of the selectable event graphic and wherein each selectable event handler is associated with at least one target datum within the target data set.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 2A-2B are exemplary embodiments of a graphical user interface;

DETAILED DESCRIPTION

At a high level, aspects of the present disclosure are directed to systems and methods for validation of data entries for user interface data sets. In an embodiment system include a processor configured to receive data entries, validate the data entries, generate data requests and construct a user interface data structure as a function of data responses made in response to the data requests. In an embodiment, system may be communicatively connected to a large language model to generate subsequent data requests and to translate user communications into user requests. In an embodiment, validation may be done using geographical constraints and/or through determination of illnesses.

Aspects of the present disclosure can be used to translate information from a natural language format into a computer language format. Aspects of the present disclosure can also be used to dynamically generate data requests based on user communications. Exemplary embodiments illustrating aspects of the present disclosure are described below in the context of several specific examples.

Figure 1:
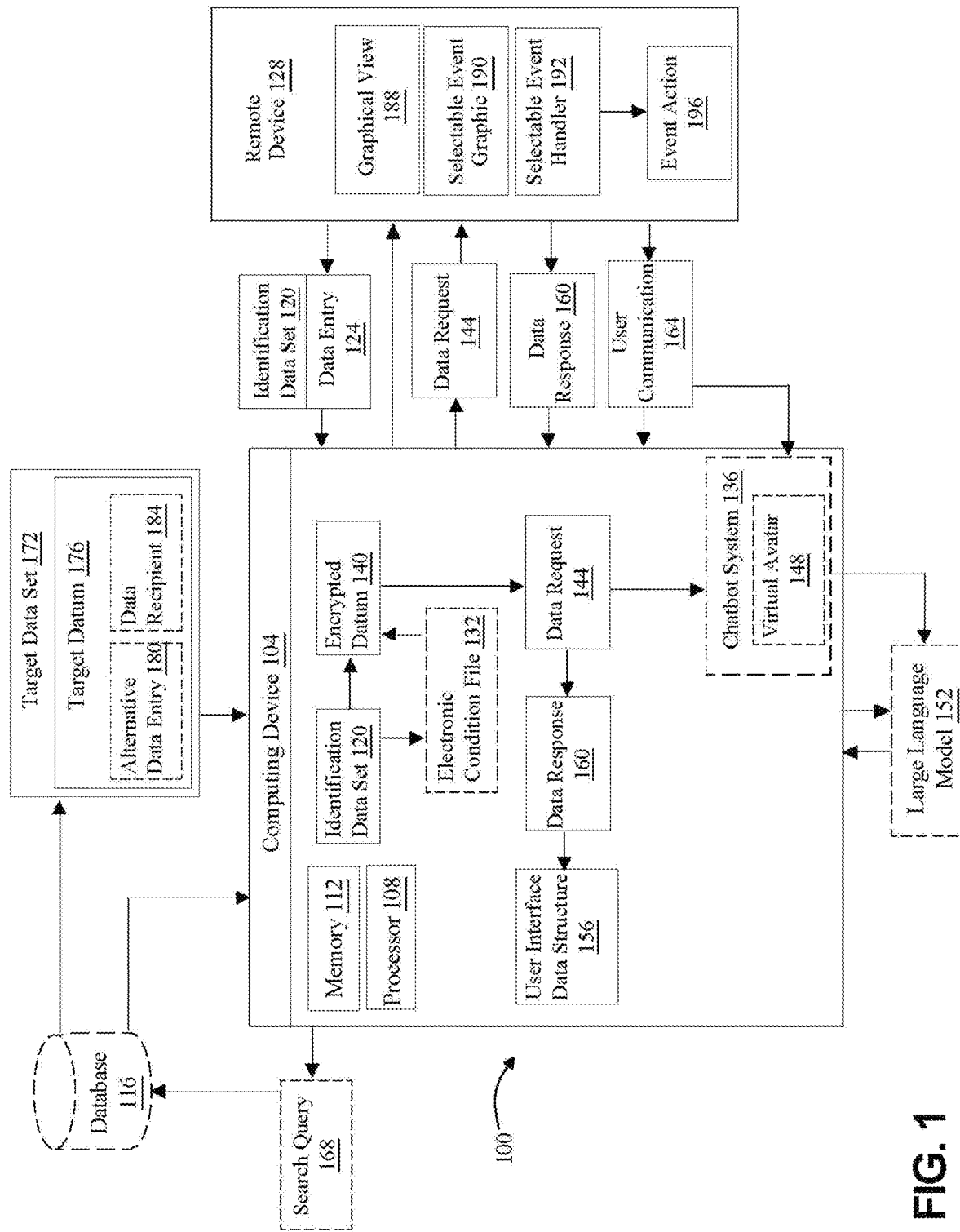
FIG. 1 is a block diagram illustrating an exemplary embodiment of a system for validation of data entries for user interface data sets.

Referring now to FIG. 1, a system 100 for validation of data entries for user interface data sets described. System 100 includes a computing device 104. System 100 includes a processor 108. Processor 108 may include, without limitation, any processor 108 described in this disclosure. Processor 108 may be included in a and/or consistent with computing device 104. In one or more embodiments, processor 108 may include a multi-core processor. In one or more embodiments, multi-core processor may include multiple processor cores and/or individual processing units. "Processing unit" for the purposes of this disclosure is a device that is capable of executing instructions and performing calculations for a computing device 104. In one or more embodiments, processing units may retrieve instructions from a memory, decode the data, secure functions and transmit the functions back to the memory. In one or more embodiments, processing units may include an arithmetic logic unit (ALU) wherein the ALU is responsible for carrying out arithmetic and logical operations. This may include, addition, subtraction, multiplication, comparing two data, contrasting two data and the like. In one or more embodiments, processing unit may include a control unit wherein the control unit manages execution of instructions such that they are performed in the correct order. In none or more embodiments, processing unit may include registers wherein the registers may be used for temporary storage of data such as inputs fed into the processor and/or outputs executed by the processor. In one or more embodiments, processing unit may include cache memory wherein memory may be retrieved from cache memory for retrieval of data. In one or more embodiments, processing unit may include a clock register wherein the clock register may be configured to synchronize the processor with other computing components. In one or more embodiments, processor 108 may include more than one processing unit having at least one or more arithmetic and logic units (ALUs) with hardware components that may perform arithmetic and logic operations. Processing units may further include registers to hold operands and results, as well as potentially "reservation station" queues of registers, registers to store interim results in multi-cycle operations, and an instruction unit/control circuit (including e.g. a finite state machine and/or multiplexor) that reads op codes from program instruction register banks and/or receives those op codes and enables registers/ arithmetic and logic operators to read/output values. In one or more embodiments, processing unit may include a floating-point unit (FPU) wherein the FPU may be configured to handle arithmetic operations with floating point numbers. In one or more embodiments, processor 108 may include a plurality of processing units wherein each processing unit may be configured for a particular task and/or function. In one or more embodiments, each core within multi-core processor may function independently. In one or more embodiments, each core within multi-core processor may perform functions in parallel with other cores. In one or more embodiments, multi-core processor may allow for a dedicated core for each program and/or software running on a computing system. In one or more embodiments, multiple cores may be used for a singular function and/or multiple functions. In one or more embodiments, multi-core processor may allow for a computing system to perform differing functions in parallel. In one or more embodiments, processor 108 may include a plurality of multi-core processors. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, system 100 includes a memory 112 communicatively connected to processor 108, wherein the memory 112 contains instructions configuring processor 108 to perform any processing steps as described herein. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of computing device 104, instructions and/or information may be transmitted to primary memory wherein information may be processed. In one or more embodiments, information may only be populated within primary memory while a particular software is running. In one or more embodiments, information within primary memory is wiped and/or removed after computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 108 may access the information from primary memory.

Still referring to FIG. 1, system 100 may include a database 116. Database may include a remote database 116. Database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, system 100 may include and/or be communicatively connected to a server, such as but not limited to, a remote server, a cloud server, a network server and the like. In one or more embodiments. In one or more embodiments, computing device 104 may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by system computing device 104. In one or more embodiments, computing device 104 may transmit processes to server wherein computing device 104 may conserve power or energy.

With continued reference to FIG. 1, one or more processes as described in this disclosure may be performed by server. In one or more embodiments, processor 108 may communicate with server to receive information needed for one or more instructions tasked by processor 108. In one or more embodiments, server may include one or more systems and/or software configured to provide information and/or data to processor 108. A "server" for the purposes of this disclosure is a system that provides resources, data or services to other computing systems over a network. For example, and without limitation, server may include a web server, a file server, a database server, and/or the like.

With continued reference to FIG. 1, processor 108 is configured to receive an identification data set 120. An "identification data set" is a set of information pertaining to an individual. For example, and without limitation, identification data set 120 may include a name, an address, a social security number, a date of birth and/or the like. In one or more embodiments, Identification data set 120 may include information such as, but not limited to, medical information pertaining to previous diagnoses, current medications being taken, recent medical visits, future medical visits, age, height, gender, weight and/or the like. In one or more embodiments, identification data set 120 may include any medical information pertaining to a particular individual. In one or more embodiments, identification data set 120 may include any information pertaining to a user. A "user" for the purposes of this disclosure is an individual interacting with system 100. For example, and without limitation user may include a medical patient, an individual seeking to input identification set into system 100 and/or the like. In one or more embodiments, user may include an individual or patient seeking medication and/or a refill on existing medication. In one or more embodiments, user may include any individual seeking medical attention and/or medical care. In one or more embodiments, identification data set 120 may include a unique identifier. A "unique identifier" as described in this disclosure is a unique code or number that distinguishes an individual from another. For example, without limitation unique identifier may include a unique set of alphanumeric characters to identify user. In one or more embodiments, unique identifier may be used to distinguish between one user and another. In one or more embodiments, information about user may be located on database 116, wherein unique identifier may be used to retrieve information about user. In one or more embodiments, user may input unique identifier, wherein processor 108 may be configured to retrieve information about user from database 116.

With continued reference to FIG. 1, identification data set 120 may include information about the medication a user is currently taking, the dosage of the medication, medical professionals that the user has interacted with or will interact with and/or the like. In one or more embodiments, identification data set 120 may include current or previous medical diagnoses made by a medical professional, various allergies a user may have, medications a user has taken in the past, upcoming medical visits and/or the like. In one or more embodiments, identification data set 120 may include information about a particular health insurance the user has. This may include but is not limited to deductibles, premiums, cost of co-pays, the providers that a user may visit and/or the like.

With continued reference to FIG. 1, identification data set 120 may include an electronic condition file 132 associated with user. A "electronic condition file" for the purposes of this disclosure is a patient medical record that is stored in a digital format. For example, and without limitation, electronic condition file 132 may include a patient's name, age date of birth, recent lab results, recent medications provided, recent treatment given and/or the like. In one or more embodiments, electronic condition file 132 may include an electronic heath record of a patient. In one or more embodiments, electronic condition file 132 may include any information that a medical professional may record about a patient in the course of treatment.

With continued reference to FIG. 1, identification data set 120 may include a geographic location. A "geographic location" for the purposes of this disclosure refers to the physical location in which a user resides. For example, and without limitation, geographic location may include "Los Angeles, CA" wherein the geographic location may indicate that a user resides in Los Angeles. In one or more embodiments, geographic location may include a city, state, zip code, country and/or any other information indicating a physical location of user.

With continued reference to FIG. 1, identification data set 120 includes a plurality of data entries 124. A "data entry" for the purposes of this disclosure is a unit of information inputted into a digital system for storage, retrieval, or processing. In one or more embodiments, data entry 124 may include information received from user. In one or more embodiments, information may be received by computing devices 104, such as laptops, smartphones, desktop computers and/or the like. In one or more embodiments, each unit of information within identification data set 120 may include a single data entry 124. In one or more embodiments, identification data set 120 may include a plurality of data entries 124, wherein each data entry 124 may refer to a specific set of information. For example, and without limitation, a first data entry 124 may be associated with a name, while a second data entry 124 may be associated with a medication taken. In one or more embodiments, data entries 124 may be received by a remote device 128. A "remote device" for the purposes of this disclosure refers to a computing system that is separate and distinct from that of computing device 104. For example, and without limitation, remote device 128 may include a smartphone, a desktop computer, a laptop computer and/or any processing unit as described in this disclosure. In one or more embodiments, system 100 may be communicatively connected to one or more remote devices 128. In one or more embodiments, identification data set 120 may be received by a first remote device of one or more remote devices 128. In one or more embodiments, a user may input through a user interface one or more data entries 124 which may be received as identification data set 120.

In one or more embodiments, identification data set 120 may be received by a user through a user interface as described in further detail below. In one or more embodiments, identification data set 120 may be received through a chatbot system 136 as described in further detail below. In one or more embodiments, A user interface may prompt user with a plurality of questions, wherein a user may input responses to the questions in order to receive identification data set 120. In one or more embodiments, identification data set 120 may include a plurality of data entries 124 and/or a singly data entry 124. In one or more embodiments, identification data set 120 may be received through a chatbot system 136 and/or a user interface as described in further detail below.

With continued reference to FIG. 1, in one or more embodiments, receiving identification data set 120 may include receiving a digital file containing information associated with identification data set 120. In one or more embodiments, a user, through remote device 128 may transmit images and/or digital documents to processor 108 for storage within identification data set 120. In one or more embodiments, a user through remote device 128, may transmit a digital version of a physical document. For example, and without limitation, a user may submit a digital scan or an image of a driver's license, a digital scan of a medication prescription, an image of a medication bottle and/or the like. In one or more embodiments, processor 108 may perform one or more OCR processes to extract textual information from within the digital file or digital document. In one or more embodiments, textual information may be stored as digital entries within identification data set 120.

Still referring to FIG. 1, in some embodiments, optical character recognition or optical character reader (OCR)

includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition May recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases. a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 4-6. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 4-6.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, processor 108 is configured to validate at least one data entry 124 of the plurality of data entries 124 within identification data set 120. In one or more embodiments, processor 108 is configured to validate at least one data entry 124 of the plurality of data entries 124 by comparing the identification data set 120 to at least one datum 140. As described in this disclosure a process of "validating" information includes a process of ensuring that the information provided is suitable for processing. For example, and without limitation, validating data entries 124 may include ensuring that information within data entries 124 are accurate. This may include, for example, ensuring that the user's name is accurate, ensuring that the user's address is accurate, ensuring that the medication the user provided is correct and/or the like. In one or more embodiments, a process of validating data entries 124 may include ensuring that a user satisfies one or more requirements needed for further processing. This may include for example, ensuring that the user is a current patient and not a new patient, ensuring that the patient lives within a geographical area that allows for the processing of identification data set 120 and/or the like. In one or more embodiments, validating at least one data entry 124 may include a process of comparing identification data set 120 to known information stored on database 116. This may include but is not limited to, known information about the user received on a previous iteration, information within electronic condition file 132 and/or an electronic health record stored on database 116 and/or another database 116 and/or the like. In one or more embodiments, a process of validating identification data set 120 may include a processor 108 of validating one or more data entries 124 within identification data set 120. In one or more embodiments, a process of validating data entries 124 may include a process of ensuring that data entries 124 are either correct or fall within one or more predetermined constraints. In one or more embodiments, a process of validating data entries 124 may include a determination of whether a patient already has a prescribed medication. In one or more embodiments, processing of identification data set 120 may be exclusive either to patients with existing medications and/or patients requesting a specific category of medications. For example, and without limitation, data entry 124 indicating a currently prescribed medication may be deemed to be valid. Similarly, data entry 124 indicating a desire to receive antibiotics may also be deemed to be valid. However, and continuing the example, a request for an initial medication prescription such as diabetic medication may be deemed to be invalid.

With continued reference to FIG. 1, in one or more embodiments, processor 108 is configured to validate at least one data entry 124 of the plurality of data entries 124 by comparing the identification data set 120 to at least one datum 140. A "datum" as described in this disclosure is a unit of information used to determine a validity of an identification data set. For example and without limitation, datum may include a geographic location used to determine if the identification data set contains a similar location. In another non-limiting example, datum 140 may include an electronic health record wherein identification data set may be compared to an electronic health record of a patient to ensure that data within identification data set and the electronic health record contain similar information. In one or more embodiments, datum 140 may include an encrypted datum. An "encrypted datum" for the purposes of this disclosure refers to a unit of information that has been translated into an unreadable encoded format. In one or more embodiments, database 116 may include a plurality of datum 140, wherein each datum 140 may refer to a unit of information that is stored in an unreadable format. In one or more embodiments, datum 140 may include identification data sets 120 received on a previous iteration of the processing of system 100, such as for example, on a previous hour, day and/or the like. In one or more embodiments, datum 140 may include data entries 124 received on a previous iteration of the processing. In one or more embodiments, datum 140 may include electronic health records of a plurality of patients. In one or more embodiments, datum 140 may include units of information associated with electronic health records of patients. In one or more embodiments, database 116 may include information associated with a plurality of users. In one or more embodiments, information associated with the plurality of users may be stored as a plurality of datum 140. In one or more embodiments, identification data set 120 may be encrypted and/or stored on database 116 as datum 140, wherein processor 108 may use identification data set 120 on future iteration for validation of data entries 124. In one or more embodiments, datum 140 may be encrypted or encoded in any way as described below. In one or more embodiments, datum 140 may be unencrypted and/or unencoded in any way as described below.

With continued reference to FIG. 1, in one or more embodiments, datum 140 may include a list of requirements of what units of information might be needed within identification data set. In one or more embodiments, the list of requirements, may include, but are not limited to, a name, an age, a health insurance card, a weight, an address and/or the like. In one or more embodiments, processor may be configured to compare identification data set to datum 140 to identify if all the required information as indicated by datum has been identified within identification data set. This may include, for example, identification of a name within identification data set to ensure that a name is present. In one or more embodiments, datum 140 may include requirements and/or information pertaining to what might be required within identification data set. In an embodiment, in instances in which information within identification data set may be missing, processor may invalidate identification data set based on missing data entries. In one or more embodiments, datum 140 may be used to identify data entries within identification data set. In an embodiment, missing data entries such as for example, a missing name, date of birth and/or the like, may require invalidation of identification data set. In one or more embodiments, datum 140 may include an address verification. In one or more embodiments, processor may be configured to compare an address within identification data set 140 to a known or stored address stored on database 116. In one or more embodiments, datum 140 may include instructions for processor to compare an address within identification data set to an address listed on an ID card, an address received on a previous iteration and/or the like. In one or more embodiments, datum 140 may include a requirement for an identification card, such as for example, a driver's license, a state or federal issued identification card and/or the like. In an embodiment, datum 140 may indicate a requirement for identification wherein processor may identify a presence of an identification card.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful time-frame may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Keys may be generated by random variation in selection of prime numbers, for instance for the purposes of a cryptographic system such as secret that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Cryptographic system may be configured to generate a session-specific secret. Session-specific secret may include a secret, which may be generated according to any process as described above, that uniquely identifies a particular instance of an attested boot and/or loading of software monitor. Session-specific secret may include without limitation a random number. Session-specific secret may be converted to and/or added to a secure proof, verification datum, and/or key according to any process as described above for generation of a secure proof, verification datum, and/or key from a secret or "seed"; session-specific secret, a key produced therewith, verification datum produced therewith, and/or a secure proof produced therewith may be combined with module-specific secret, a key produced therewith, a verification datum produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory that may be overwritten and/or corrupted.

A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

With continued reference to FIG. 1, in one or more embodiments, data (e.g. identification data set 120, data entries 124, encrypted data, etc.) may be encoded using an encoder. An "encoder" as described in this disclosure refers to a software component that converts data from one format to another. In one or more embodiments, encoder may include a digital data encoder, a hardware encoder, a data compression encoder, a URL encoder, a machine learning encoder and/or any encoder as described in this disclosure. In one or more embodiments, encoder may be operating on a server and/or on processor 108. In one or more embodiments, system 100 may include an encoder, wherein system 100 may encode data. In one or more embodiments, encoder may be configured to encode identification data set 120 and compare encoded identification data set 120 to an datum 140 having encoded data. In one or more embodiments, identification data set 120 may be encoded wherein encoder may be configured to encode isolated data as well such that comparison may be achieved through two data sets having similar formats. In one or more embodiments, encoder may be configured to encode identification data set 120 and/or data entries 124 using UTF-8 encoding techniques. In one or more embodiments, UTF-8 may include a variable-length character encoding process that can represent every character in the Unicode character set. In one or more embodiments, encoder may be configured to convert isolated data into a UTF-8 format. In one or more embodiments, encoder may be configured to convert identification data set 120 and/or data entries 124 into a bag-of-words (BoW) format. In one or more embodiments, Bag-of-Words may include a text representation technique where a document is represented as a set of words and their frequencies, ignoring grammar and word order. In one or more embodiments encoder may be configured to encode isolated data using Vector quantization compression, run-length-encoding, burrows-wheeler transform (BWT) compression, delta encoding, perceptual hashing and/or the like. In one or more embodiments, encoded information within identification data set 120 and identification data set 120 may be used for comparison in order to reduce storage consumption and/or processing power. In one or more embodiments, an encoder may encode identification data set 120 and compare identification data set 120 to datum 140. In one or more embodiments, encoding may include a hashing process, such as any hashing process as described in this disclosure, wherein two hashes may be compared to one another. In one or more embodiments, each data entry 124 may be hashed and compared to datum 140.

With continued reference to FIG. 1, encoder may utilize one or more transformer architecture techniques as described in this disclosure, such as in reference to a large language model as described in further detail below. In one or more embodiments, encoder may be trained through one or more representation learning techniques that map inputs into a comparable latent space. In one or more embodiments, representation learning techniques may place similar inputs close to one another while non-similar inputs are placed further apart. In one or more embodiments, training encoder may include the use of classification wherein the output is a label or category. In one or more embodiments, the encoder may be trained by minimizing a classification loss. In one or more embodiments, encoder may be trained to learn features that may be used to distinguish between different classes allowing for the mapping of similar data points close together in a latent space. In one or more embodiments, encoder may be trained using a machine learning model such as any machine learning model as described in this disclosure. In one or more embodiments, encoder may be trained to directly learn a distance or similarity metric between inputs. In one or more embodiments, encoder may be trained using self-supervised learning wherein encoder may be configured to predict missing words in a sentence or configured to predict context of data. In one or more embodiments, self-supervised learning may include a self-supervised learning process as described in this disclosure.

With continued reference to FIG. 1, in one or more embodiments, validating at least one data entry 124 of the plurality of data entries 124 may include identifying a corresponding electronic condition file associated with a user on an electronic file database and validating the at least one data entry 124 as a function of the identification. A "corresponding electronic condition file" as described in this disclosure is an electronic condition file 132 associated with the user identified in identification data set 120. In one or more embodiments, a database 116 such as an electronic file database may include a plurality of electronic condition files 132, wherein each electronic condition file 132 is associated with a differing user. In one or more embodiments, processor 108 may receive identification data set 120 and retrieve a corresponding electronic condition file associated with the user within identification data set 120. In one or more embodiments, identification data set 120 may include information, such as a name, a social security number, a unique ID and/or the like which may be used to retrieve a corresponding electronic condition file. In one or more embodiments, processor 108 may validate at least one data entry 124 by confirming that an electronic condition file 132 exists on database 116. In one or more embodiments, datum 140 may include a retrieved electronic condition file 132 from electronic file database. In one or more embodiment, s datum 140 may include "NULL" in instances in which a corresponding electronic condition file is not located on electronic file database. In one or more embodiments, data entries 124 may be validated by either ensuring that a corresponding electronic condition file exists and/or by ensuring that information within identification data set 120 matches information within electronic condition file 132. In one or more embodiments, processor 108 may be configured to identify a corresponding electronic condition file, wherein data may be validated as a function of the identification.

With continued reference to FIG. 1, in one or more embodiments, datum 140 may include a geographic constraint. A "geographic constraint" for the purposes of this disclosure is information associated with one or more geographical locations that are used to determine the validity of data entries 124 based on their associated geographic location. For example, and without limitation, geographic location may include the United States, wherein a data entry 124 indicating that a user lives outsides of the United States may be deemed invalid. In one or more embodiments, geographic constraints may be limited to states that allow for the processing of information with little to no medical professional intervention. In one or more embodiments, datum 140 may include predetermined geographic locations that may be used to validate and/or invalidate data entries 124. Geographic constraint may be used to determine if a user lives within a geographic location that will allow for the validity of identification data set 120 and/or a data entry 124. In one or more embodiments, identification data set 120 may be used for a medical prescription and/or a refill of an existing prescription wherein only individuals residing within a particular geographic location may receive a medication or refill medication through a computing device 104. In one or more embodiments, geographic constraint may include cities, states and/or countries that allow for medication prescription without the need for a physician and/or with minimal need for a physician. In one or more embodiments, individuals residing outside of locations listed within geographic constraint may be deemed invalid.

With continued reference to FIG. 1, processor 108 is configured to receive a first data request as a function of the validation. A "data request" for the purposes of this disclosure is a request for information. For example, and without limitation, data request 144 may include a request for a particular dosing for a medication indicated within identification data set 120. In one or more embodiments, data request 144 may include requests for information such as, but not limited to, symptoms of a user, allergies of a user, the specific medication a user is taking, the user's adherence to a particular medication, information regarding a particular illness, information regarding physiological changes since a previous visit and/or the like. In one or more embodiments, data request 144 may may request why a user is interacting with system 100 on this particular occasion. In one or more embodiments, data request 144 may include a request to choose a particular answer from a list of questions provided. For example, and without limitation, data request 144 may indicate "are you here for A, B or C?" wherein a user may respond to data request 144 with one of three responses. In one or more embodiments, data request 144 may be generic, wherein each user may receive a same or similar initial data request 144. In one or more embodiments, data request 144 may be specific to a particular data entry 124, such as for example, specific to a medication recently taken, specific to a medical visit recently undergone and/or the like. In one or more embodiments, data request 144 may include a request to select one or more preconfigured answers. In one or more embodiments, a user through a user interface, may select one or more preconfigured answers based on the presented data request 144. In one or more embodiments, data request 144 may include an initial request for information. In one or more embodiments, data request 144 may include a request for information not initially placed within identification data set 120. This may include a request for information such as, a missing name, a missing address, a missing medication and/or the like. In one or more embodiments, processor 108 may transmit data request 144 to first remote device. In one or more embodiments, processor 108 may be configure a user interface for first remote device, wherein first remote device may respond to data request 144 through user interface. In one or more embodiments, data request 144 may only be transmitted as a function of the validation. In one or more embodiments, one or more data entries 124 may require validation prior to transmission and/or generation of data request 144. In one or more embodiments, data request 144 may only be transmitted and/or generated following validation of one or more data entries 124.

With continued reference to FIG. 1, in one or more embodiments, data request 144 may include questions that can be used to screen a patient for allergies. In one or more embodiments, data requests may include questions, such as allergies, genetic conditions, physiological responses to various medications and/or the like that may be used to identify an allergic reaction or potential allergic reaction to one or more medications. For example, and without limitation, data requests may include a question such as "do you suffer from G6PD?" wherein a response of "yes" may indicate that the patient suffers from G6PD. As a result, processor 108 may determine that the patient may be allergic to medications that are commonly not recommended for patients with G6PD, such as aspirin.

With continued reference to FIG. 1, In one or more embodiments, processor 108 may configure a chatbot system 136 and/or virtual avatar 148 to communicate data request 144. A "virtual avatar," as used in this disclosure is defined as an interactive character or entity in a virtual environment. In a non-limiting example, virtual avatar 148 may include a virtual representation of an individual in a virtual environment. In an embodiment, a virtual avatar 148 may be customizable. Virtual avatar 148 may include, without limitation, an animal, human, robot, inanimate object, and the like, and may include one or more personalized characteristics, wherein personalized characteristics may be programmed by an individual tasked with operating system. In a non-limiting example, virtual environment may include an extended reality space, such as, without limitation, augmented reality (AR) space, virtual reality (VR) space, and/or any other digital realities. For example, and without limitation, extended reality space may include a virtual classroom, virtual meeting room, virtual study room, and the like thereof. In one or more embodiments, virtual avatar 148 may include a virtual representation of a living being and/or inanimate object capable of conveying speech. In one or more embodiments, virtual avatar 148 may convey and/or request information to or from a user, such as data request 144. In one or more embodiments, virtual avatar 148 may be configured to convey information, such as data request 144 in the form of speech. In one or more embodiments, virtual avatars 148 may mimic a medical professional wherein virtual avatar 148 may represent a virtual medical professional. In one or more embodiments, virtual avatar 148 may include one or more text to speech algorithms in order to convey textual data in a vocal format. In one or more embodiments, virtual avatar 148 may be programmed to interact with a user (e.g., virtual avatar 148 may act as a medical professional speaking with a patient) of system and convey over information. In one or more embodiments, virtual avatar 148 may include a chatbot system 136 as described in reference to at least FIG. 3. In one or more embodiments, virtual avatar 148 and/or chatbot system 136 may be communicatively connected to a large language model, wherein the virtual avatar 148 is configured to receive questions or follow up questions from the user and utilize the large language model to generate response. For example, and without limitation, a user may respond with "can you define this word or explain it more simply" wherein virtual avatar 148 may transmit the interaction to the large language model (LLM 152), receive an output from the LLM 152 and convey the output to the user through the virtual avatar 148. In one or more embodiments, system 100 may include virtual avatar 148 wherein information transmitted and/or received by system may be done through virtual avatar 148 and/or chatbot system 136. A "chatbot system" for the purposes of this disclosure is a program configured to simulate human interaction with a user in order to receive or convey information. In some cases, chatbot system 136 may be configured to receive identification data set 120 and/or elements thereof and any other data as described in this disclosure through interactive questions presented to the user. In one or more embodiments, chatbot system 136 may be configured to simulate human interaction wherein chatbot system 136 may present questions in responses in a natural language format. In one or more embodiments, inputs by the user may also be received in a natural language format wherein chatbot system 136 may be configured to convert the inputs into computer languages. In one or more embodiments, chatbot system 136 may be configured to simulate human interaction in a variety of languages based on the preferences of a user. In one or more embodiments, while data processing and/or information received may be in a particular language, chatbot may be configured to translate data based on the preferences of the user. In one or more embodiment, chatbot may be configured to engage in passive data monitoring wherein a user's interactions with chatbot system 136 and/or computing device 104 may be recorded inexplicitly. For example, and without limitation, chatbot system 136 may present prompts to a user wherein chatbot system 136 may record the user's reaction time, the user's choice of words, the user's attention to detail in the answers and the like. In one or more embodiments, chatbot system 136 may be configured to record actions or behaviors that a user unconsciously exhibits. In one or more embodiments, chatbot system 136 may be configured to communicate data request 144 to a user.

With continued reference to FIG. 1, transmitting the at least one data request 144 may include transmitting at least one data request 144 to the first remote device using chatbot system 136.

With continued reference to FIG. 1, data request 144 may be transmitted to remote device 128. In one or more embodiments, a user may receive data request 144 through remote device 128. In one or more embodiments, processor 108 may configure a graphical user interface for first remote device, wherein data request 144 may be presented through graphical user interface. In one or more embodiments, a user may interact with graphical user interface in order to respond to data request 144. In one or more embodiments, chatbot system 136 and/or virtual avatar 148 may be included within graphical user interface.

With continued reference to FIG. 1, processor 108 may be configured to create a user interface data structure 156 as a function of at least data request 144 and/or any other data as described in this disclosure. As used in this disclosure, "user interface data structure" is a data structure representing a specialized formatting of data on a computer configured such that the information can be effectively presented for a user interface. User interface data structure 156 may include any information as described in this disclosure, such as but not limited to data requests 144, information to construct chatbot system 136 and/or virtual avatar 148 and/or the like.

With continued reference to FIG. 1, processor 108 may be configured to transmit the user interface data structure 156 to a graphical user interface. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. Processor 108 may transmit the data described above to database 116 wherein the data may be accessed from database 116. Processor 108 may further transmit the data above to a device display or another computing device 104.

With continued reference to FIG. 1, apparatus may include a graphical user interface (GUI). For the purposes of this disclosure, a "user interface" is a means by which a user and a computer system interact. For example, through the use of input devices and software. In some cases, processor 108 may be configured to modify graphical user interface as a function of at least data request 144 and visually present data request 144 through GUI. A user interface may include graphical user interface, command line interface (CLI), menu-driven user interface, touch user interface, voice user interface (VUI), form-based user interface, any combination thereof and the like. In some embodiments, a user may interact with the user interface using a computing device 104 distinct from and communicatively connected to processor 108. For example, a smart phone, smart tablet, or laptop operated by the user and/or participant. A user interface may include one or more graphical locator and/or cursor facilities allowing a user to interact with graphical models and/or combinations thereof, for instance using a touchscreen, touchpad, mouse, keyboard, and/or other manual data entry 124 device. A "graphical user interface," as used herein, is a user interface that allows users to interact with electronic devices through visual representations. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in graphical user interface. Persons skilled in the art, upon reviewing the entirety of this disclosure, will be aware of various ways in which a graphical user interface and/or elements thereof may be implemented and/or used as described in this disclosure.

With continued reference to FIG. 1, GUI may contain one or more interactive elements. An "interactive element" for the purposes of this disclosure is an element within a graphical user interface that allows for communication with apparatus by a user. For example, and without limitation, interactive elements may include push buttons wherein selection of a push button, such as for example, by using a mouse, may indicate to system to perform a particular function and display the result through graphical user interface. In one or more embodiments, interactive element may include push buttons on GUI, wherein the selection of a particular push button may result in a particular function. In one or more embodiments, interactive elements may include words, phrases, illustrations and the like to indicate the particular process the user would like system to perform. In one or more embodiments, interaction with interactive elements may result in the receipt of information by processor 108. In one or more embodiments, a user may interact with interactive elements in order to respond to data request 144.

With continued reference to FIG. 1, processor 108 is configured to receive at least one data response 160 from remote device 128 as a function of at least one data request 144. A "data response 160" for the purposes of this disclosure refers to information that is received in response to data request 144. For example, and without limitation, processor 108 may transmit data request 144 to remote device 128 wherein data response 160 may be transmitted from remote device 128 to processor 108 in response. In one or more embodiments, data response 160 may include user inputted information. In one or more embodiments, a user may transmit information to processor 108 in response to data request 144. In one or more embodiments, interaction with GUI may result in the generation of data response 160. In one or more embodiments, GUI may present interactive elements, such as push buttons and/or the like wherein interaction of interactive elements may result in the generation of data response 160. In one or more embodiments, processor 108 may present one or more data responses 160 for a user to select through GUI, wherein data response 160 may be generated as a function of the selection. In one or more embodiments, a user may respond to data request 144 using a chatbot, by communicating with virtual avatar 148 and/or chatbot system 136 and/or the like. In a nonlimiting example, data response 160 may include 'diabetes' wherein a user may input 'diabetes' to a data request 144 asking for recent medical diagnoses. In one or more embodiments, data request 144 may include a request or information as to what the user would like accomplished whereas a data response 160 may include information indicating the user's request for system 100. For example, and without limitation, data response 160 may indicate that a patient would like a refill on medication, a patient would like a new prescription, a patient would like a substitute medication in lieu of their current medication and/or the like. In one or more embodiments, chatbot system 136 may be configured to receive data response 160.

With continued reference to FIG. 1, processor 108 may receive data response 160 by receiving a user communication 164 through chatbot system 136. A "user communication 164" for the purposes of this disclosure is information associated with an interaction between user and chatbot system 136. For example, and without limitation, user communication 164 may include textual information transmitted to chatbot system 136 by user. In one or more embodiments, a user may communicate with chatbot system 136 wherein processor 108 may receive the user communication 164 and generate data response 160. In one or more embodiments, the user communication 164 may include textual information that a user has input into system using chatbot system 136 100. In one or more embodiments, user communication 164 may include messages and/or responses made in a natural language format. In one or more embodiments, user communication 164 may include statements made by a user in response to an interaction with chatbot system 136. In one or more embodiments, user communications 164 may require some sort of processing in order to translate the user communication 164 into a response that can be read by processor 108. In one or more embodiments, processor 108 may use a large language model to translate user communications 164 into data responses 160 that can be interpreted by processor 108. In one or more embodiments, information presented in a natural language format may require translation and/or conversion prior to processing. In one or more embodiments, user communications 164 may be transmitted to large language model for processing. In one or more embodiments, large language model may be configured to translate user communication 164 into instructions that can be interpreted by processor 108. In one or more embodiments, processor 108 may present preconfigured data responses 160 to a user that may be interpreted by processor 108. In one or more embodiments, a user may select one or more preconfigured data response 160 through GUI.

Still referring to FIG. 1, system 100 may include and/or be communicatively connected to a large language model (LLM 152). A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data, electronic records, and the like. In some embodiments, training sets may include a variety of subject matters, such as, as nonlimiting examples, medical report documents, electronic health records, entity documents, business documents, inventory documentation, emails, user communications 164, advertising documents, newspaper articles, information from regulatory agencies, and the like. In some embodiments, training sets of an LLM 152 may include information from one or more public or private databases 116. As a non-limiting example, training sets may include databases 116 associated with an entity. In some embodiments, training sets may include portions of documents associated with the electronic records correlated to examples of outputs. In an embodiment, an LLM 152 may include one or more architectures based on capability requirements of an LLM 152. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, an LLM 152 may be generally trained. As used in this disclosure, a "generally trained" LLM 152 is an LLM 152 that is trained on a general training set comprising a variety of subject matters, data sets, and fields. In some embodiments, an LLM 152 may be initially generally trained. Additionally, or alternatively, an LLM 152 may be specifically trained. As used in this disclosure, a "specifically trained" LLM 152 is an LLM 152 that is trained on a specific training set, wherein the specific training set includes data including specific correlations for the LLM 152 to learn. As a non-limiting example, an LLM 152 may be generally trained on a general training set, then specifically trained on a specific training set. In an embodiment, specific training of an LLM 152 may be performed using a supervised machine learning process. In some embodiments, generally training an LLM 152 may be performed using an unsupervised machine learning process. As a non-limiting example, specific training set may include information from a database 116. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM 152 may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM 152 may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM 152 may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM 152 may include a text prediction based algorithm configured to receive an article and apply a probability distribution to the words already typed in a sentence to work out the most likely word to come next in augmented articles. For example, if some words that have already been typed are "patient may," then it may be highly likely that the word "exhibit" will come next. An LLM 152 may output such predictions by ranking words by likelihood or a prompt parameter. For the example given above, an LLM 152 may score "you" as the most likely, "your" as the next most likely, "his" or "her" next, and the like. An LLM 152 may include an encoder component and a decoder component.

Still referring to FIG. 1, an LLM 152 may include a transformer architecture. In some embodiments, encoder component of an LLM 152 may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM 152 and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM 152 may predict the next word by searching for a set of positions in a source sentence where the most relevant information is concentrated. An LLM 152 may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanism may include, without limitation, generalized attention self-attention, multi-head attention, additive attention, global attention, and the like. In generalized attention, when a sequence of words or an image is fed to an LLM 152, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM 152 may pick up particular parts at different positions in the input sequence and over time compute an initial composition of the output sequence. In multi-head attention, an LLM 152 may include a transformer model of an attention mechanism. Attention mechanisms, as described above, may provide context for any position in the input sequence. For example, if the input data is a natural language sentence, the transformer does not have to process one word at a time. In multi-head attention, computations by an LLM 152 may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM 152 may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM 152 may either attend to all source words or predict the target sentence, thereby attending to a smaller subset of words.

With continued reference to FIG. 1, multi-headed attention in encoder may apply a specific attention mechanism called self-attention. Self-attention allows models such as an LLM 152 or components thereof to associate each word in the input, to other words. As a non-limiting example, an LLM 152 may learn to associate the word "you," with "how" and "are." It is also possible that an LLM 152 learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "Os" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it. Stacking layers may allow an LLM 152 to learn to extract and focus on different combinations of attention from its attention heads.

With continued reference to FIG. 1, an LLM 152 may receive an input. Input may include a string of one or more characters. In one or more embodiments, input may include user communication 164 received by remote device 128. Inputs may additionally include unstructured data. For example, input may include one or more words, a sentence, a paragraph, a thought, a query, and the like. A "query" for the purposes of the disclosure is a string of characters that poses a question or request. In some embodiments, input may be received from a user device. User device may be any computing device 104 that is used by a user. As non-limiting examples, user device may include desktops, laptops, smartphones, tablets, and the like. In some embodiments, input may include any set of data associated with user communications 164 made to chatbot system 136 and outputs may include data responses 160.

With continued reference to FIG. 1, an LLM 152 may generate at least one annotation as an output. At least one annotation may be any annotation as described herein. In some embodiments, an LLM 152 may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

With continued reference to FIG. 1, in one or more embodiments, LLM 152 may receive user communication 164 from first remote device and generate data response 160. In one or more embodiments, data response 160 may include instructions for processor 108 to generate data, to perform calculations and/or the like. In one or more embodiments, user communication 164 may include information associated with a user's health wherein data response 160 may include categorizations associated with the user's health. In one or more embodiments user communication 164 may include information within a natural language format wherein data response 160 may include information contained within a computer language format. In one or more embodiments, LLM 152 may be configured to receive user communication 164 and output data response 160.

With continued reference to FIG. 1, data response 160 may include a search query 168. A "search query" for the purposes of this disclosure is a structured request for data. In one or more embodiments, search query 168 may be used to search a database 116 for a particular set of information. In one or more embodiments, search query 168 may include conditions for the type of data desired. In one or more embodiments, search query 168 may be in the form of a structured query language (SQL). In one or more embodiments, search query 168 may include the data fields to retrieve, such as for example, a name, an email an age and/or the like. in one or more embodiments, search query 168 may include source tables in which data should be retrieved from. In one or more embodiments, search query 168 may include conditions and/or filters. For example, and without limitation, a user may indicate that they are allergic to a specific medication wherein filters may include conditions to filter out specific medications. In one or more embodiments, search query 168 may include a plurality of nodes. A "node" as referred to herein refers to an element or entity within a data structure. A node in the context of database 116 queries, also referred to as a 'query generation node' may refer to a step or action in the process of generating a query. For example, and without limitation, node may include a step of accessing a database 116 of files, accessing a particular classification of files and the like. In one or more embodiments nodes may include steps such as, but not limited to receiving data identifying an initial set of data on database 116. In one or more embodiments, each node may represent a specific piece of information or condition related to the request generated by LLM 152. In one or more embodiments, nodes may be used to find and retrieve information within database 116. In one or more embodiments, nodes may be specific to what information should be retrieved. In one or more embodiments, nodes may include operations like table scans, index lookups, filtering conditions, and the like. In one or more embodiments, LLM 152 may be configured to generate an SQL query and/or a search query 168 including a plurality of nodes wherein each node may refer to a specific step in a process of data retrieval. In one or more embodiments, nodes may be used to filter information within database 116 based on user communication 164. In one or more embodiments, nodes may provide instructions on how to identify and select the relevant data from database 116. In one or more embodiments, nodes may represent specific actions or conditions that need to be performed or met in order to retrieve the desired information from database 116. Each node may correspond to a specific element or event and may serve as a step in the process of generating a final query. In an embodiment, each node may be associated with a separate query, wherein each node may result in a different request received from database 116. In one or more embodiments, LLM 152 may generate search query 168 to query database 116 to retrieve relevant information in association with data response 160. This will be described in further detail below. In one or more embodiments, processor 108 may be configured to query a database 116, such as validation database to receive a response.

With continued reference to FIG. 1, in one or more embodiments, chatbot system 136 may be communicatively connected to LLM 152 wherein LLM 152 may be used to generate communications for a user and receive responses similar to that of a human. In one or more embodiments, processor 108 may be configured to transmit data request 144 to a user. In one or more embodiments, processor 108 may receive user communication 164 from first device. In one or more embodiments, LLM 152 may receive user communication 164 and generate second data request. In one or more embodiments, second data request may include a request for additional information associated with user communication 164 and data request 144. For example, and without limitation, second data request may include a follow up question to a user communication 164 provided by user. In one or more embodiments, LLM 152 may receive user communication 164 and generate second data request. In one or more embodiments, second data request may include a request for information that has not been fully received in response to data request 144. In one or more embodiments, data request 144 may include an initial request to user to state their current medical condition wherein second data request may include follow up questions in response to the user's answers. In one or more embodiments, LLM 152 may be configured to present follow up questions and/or simulate human interaction by generating second data request. In one or more embodiments, processor 108 may be configured to select a particular medication and/or treatment option for a user, wherein LLM 152 may be configured to transmit subsequent data requests 144 in order to narrow down possible medications and/or treatment options until an optimal result is determined. In one or more embodiments, LLM 152 may be configured to present questions to a user similar to that of a medical professional in order to determine the root cause of an issue and/or the root cause as to why user decided to interact with system 100. In one or more embodiments, LLM 152 may utilize a logic tree to determine which medication may be best suited for an individual. In one or more embodiments, LLM 152 may receive a logic tree that narrow done medications based on responses given by a user. In one or more embodiments, LLM 152 may be configured to generate questions in the form of data requests 144 to a user in order to narrow down particular medications on the logic tree. In one or more embodiments, LLM 152 may be configured to receive a complaint a user has with a particular medication, wherein LLM 152 may determine an alternate medication from a list of approved medications based on user communications 164. In one or more embodiments, LLM 152 may be configured to ask questions to a user in the form of data requests 144 to determine if they are eligible for a medication refill. In one or more embodiments, LLM 152 may receive user communications 164. In a natural language format and output data responses 160. In one or more embodiments, LLM 152 may be configured to determine if a user is eligible for a particular medication by answering a series of questions. In one or more embodiments, LLM 152 may be configured to answer follow up questions based on whether previous communications still qualify the user for a medication refill. In one or more embodiments, subsequent user communications 164 may be received as second user communications 164. In one or more embodiments, data response 160 may include multiple user communications 164. In one or more embodiments, data response 160 may be generated as a function of a first user communication and a second user communication. In one or more embodiments, data response 160 may include information aggregated from interaction with a user. In one or more embodiments, data response 160 may include a determination made by LLM 152 model based on user communications 164. In one or more embodiments, data response 160 may include determinations indicating that a user qualifies for a medication, a particular refill and/or whether a user should communicate with a medical professional. In one or more embodiments, LLM 152 may be configured to receive user communication 164 such as, for example, symptoms a user is experiencing. In one or more embodiments, LLM 152 may be configured to generate data requests 144 that would be useful in distinguishing, by a medical professional, differing medical diagnoses. In one or more embodiments, LLM 152 may be configured to ask binary questions, such as "yes" or "no" questions in order to ensure that responses aren't inaccurate. In one or more embodiments, user communications 164 may be used to refine search query 168 in order to include medications that a user may be allergic to and/or may have a bad reaction with.

With continued reference to FIG. 1, in one or more embodiments, first data request may include a request to receive an ailment. An "ailment" as described in this disclosure is an illness or health disorder associated with an individual. For example, and without limitation, ailment may include an illness, such as a cold, a fever, the flu, diabetes, a heart disorder and/or the like. In on or more embodiments, first data request may include a request form the user to input a particular medical condition they are suffering from. In one or more embodiments, the user may respond in the form of first user communication. In one or more embodiments, LLM 152 may be configured to receive first user communication containing the ailment and generate follow up questions in the form of subsequent data requests 144, such as second data request. In one or more embodiments, second data request may include follow up questions, such the medications a user is currently taking, various side effect that were felt, various allergic reactions the medications, the dosing of the medications, the effect of the medication on the individual and/or the like. In one or more embodiments, second data request may be used to determine a user's adherence to a specific medication. In one or more embodiments, second data request may be used to request additional information from the user in order to later on be reviewed by a medical professional to make a determination. In one or more embodiments, LLM 152 may be configured to ask questions regarding a particular ailment in order to ensure that a medication is working properly. This may include questions such as symptoms the user is feeling, various physiological responses and/or the like.

With continued reference to FIG. 1, processor 108 may be configured to receive from a validation database, a target data set 172 as a function of the identification data set 120 and the at least one data response 160. A "target data set" for the purposes of this disclosure is a set of information retrieved from database 116 that complements information within identification data set 120 and data response 160. For example, and without limitation, target data set 172 may include information associated with medications that a user may be able to take and/or be prescribed. Similarly, target data set 172 may include a list of physicians within the area of the user that specialize in the user's health condition based on information within identification data set 120 and data response 160. In one or more embodiments, target data set 172 may include treatments for the users, alternative medications for the user's refills on medications for the user and/or the like. In one or more embodiments, database 116 such as a validation database may include information associated with medications and/or physicians, wherein target data set 172 may include medications and/or physicians that are deemed to be suitable for the user. In one or more embodiments, target data set 172 may include one or more target datu. A "Target datum" for the purposes of this disclosure is a unit of information within target data set 172. In one or more embodiments, target datum 176 may include a singular medication and/or a singular physician. In one or more embodiments, target data set 172 may include one or more target datum 176 depending on the constraints generated by identification datum and data response 160. For example, and without limitation, a list of target datum 176 may be narrowed based on allergic reactions, particular medication preferences and/or the like. A "validation database" for the purposes of this disclosure is a database 116 containing a plurality of target datum 176. In one or more embodiments, validation database may be used for identification data sets 120 having valid entries. In one or more embodiments, target data sets 172 may only be received from validation database following validation of one or more data entries 124. In one or more embodiments, validation database may contain a plurality of target datum 176, wherein each target datum 176 may be associated with a differing medication, a differing physician, a differing medical treatment and/or the like. In one or more embodiments, target datum 176 may include information a geographic location associated with medication. In one or more embodiments, one or more target datum 176 may describe similar medications but located at different geographic locations. In one or more embodiments, one or more target datum 176 may include information such as whether a medication is capable of being shipped, whether a physician can visit the user remotely such as through a phone call or face time. In one or more embodiments, validation database may include a plurality of medications, wherein each target datum 176 may include information about the medications, such as for example, price availability, side effects, physical location of the medication and/or the like. In one or more embodiments, target datum 176 may include information about physicians such as for example, what insurance they take, how far they are located from a user and/or the like.

With continued reference to FIG. 1, processor 108 may be configured to generate target data set 172 by selecting one or more target datum 176. In one or more embodiments, processor 108 may select one or more target datum 176 based on geographic location of user, based on ailments listed by user, based on negative reactions listed by user, based on indications as to whether user is requesting a medication refill, based on the particular type of health insurance the user has as indicated by identification data set 120 and/or the like. In one or more embodiments, LLM 152 may generate search query 168 wherein search query 168 may yield target data set 172. In one or more embodiments, processor may be configured to query validation database and/or any database as described in this disclosure to receive target data set 172. In one or more embodiments, processor ma receive target data set 172 as a function of the query. In one or more embodiments, database 116 may produce results in the form of target data set 172 associated with search query. In one or more embodiments, search query 168 may include one or more conditions and/or filters for target datum 176, that if met, will be placed within target data set 172. In one or more embodiments, conditions and/or filters may include allergic reactions, negative side effects to a particular medication, indication that a user is suffering from a particular infection and requires medication and/or the like. In one or more embodiments, filters may be limited within search query 168. For example, and without limitation, processor 108 may limit filters in search query 168 to three filters, wherein an individual allergic to more than three medications may not be recommended a medication. In one or more embodiments, a plurality of filters may result in complicated target datums 176, wherein processor 108 may be configured to instead return a "no entries found" response in lieu of a target datum 176. In one or more embodiments, target data set 172 includes a plurality of alternative data entries 180. An "alternative data entry" as described in this disclosure refers to information that is configured to replace a data entry 124 within identification data set 120. For example, and without limitation, a data entry 124 may indicate a plurality of medications being taken, wherein alternative data entry 180 may indicate a differing medication that will replace the medication within identification data set 120. In one or more embodiments, alternative data entry 180 may replace data entries 124 based on user responses with chatbot system 136. In one or more embodiments, LLM 152 may be configured to search for alternative data entries 180 in instances in which a user may be allergic to a specific medication, a particular medication is no longer available, the particular medication does not seem to be helping the user and/or the like. In one or more embodiments, targets datums may include alternative data entries 180 in in instances in which a target datum 176 and a data entry 124 within identification data set 120 differ. In one or more embodiments, alternative data entries 180 may be replace data entries 124 within identification data set 120. In one or more embodiments, alternative data entries 180 may include information about medications that will replace existing medications indicated within identification data set 120.

With continued reference to FIG. 1, In one or more embodiments, alternative data entries 180 may include medications that are supposed to replace an existing medication. In one or more embodiments, a user may indicate that they are allergic to a specific medication, wherein alternative data entries 180 may include medications not containing the same ingredients that caused the allergic reaction. In one or more embodiments, data request 144 may include a request to receive information associated with the user's allergies, the user's allergy to a specific medication, the user's physiological responses to a particular medication and/or the like. In one or more embodiments, data response 160 may include a user's response to data request in association with allergies and/or any other physiological responses. For example, and without limitation, data response 160 may include 'aspirin', wherein a user may indicate that they have an allergic reaction to aspirin and/or that the use of aspirin has been ineffective. In one or more embodiments, processor may use data response 160 to generate data filters. A "data filter" for the purposes of this disclosure is a unit of information used to exclude specific subsets of data. For example and without limitation, data filter may include 'aspirin' wherein all data containing information associated with 'aspirin' may be filtered out. In one or more embodiments, data filter may be used to filter out target datum 176 that a user is either allergic to and/or has shown a poor physiological response. In one or more embodiments, processor 108 may receive data response 160 and generate one or more data filters. In one or more embodiments, processor 108 may generate data filters by transmitting data response to LLM 152 and receiving one or more data filters. In one or more embodiments, LLM may be configured to identify what specific ingredients and/or medications a user is allergic to and generate one or more data filters as a response. In one or more embodiments, data filters may be used to filter out medications having an ingredient in which the user has had a poor physiological response with and/or is allergic to. In one or more embodiments, processor 108 may alternatively generate data filters by identifying ingredients, medications and/or key words within data response that may indicate an allergic reaction. In one or more embodiments, those key words may then be used to generate data filter. In one or more embodiments, processor may receive target data set 172 by identifying target datum 176 that do not contain medications or ingredients as indicated within the data filter.

With continued reference to FIG. 1, LLM 152 and/or processor 108 may be configured to generate search query and/or modify an existing search query based on data response 160. In one or more embodiments, search query 168 may include data filter, wherein database 116 may be queried using data filters. In one or more embodiments, data filters may be used to filter out medications and/or other target datum 176 on validation database. In one or more embodiments, search query may include a plurality of data filters, wherein for example, a first data filter may be used to filter out medications based on medical condition, a second data filter may be used to filter out medications that are unavailable to the user's geographic location and a third data filter may be used to filter out medications in which the user may be allergic to. In one or more embodiments, processor 108 may be configured to transmit a plurality of data requests 144 to a user and filter out medications based on data responses received by remote device 128. In one or more embodiments, search query may be more refined following each data response 160 until a single target datum or predetermined amount of target datum 176 are left. For example, and without limitation, target database may include 10,000 target datum, wherein following a first data response, data filter may be applied to search query, wherein only 1,0000 target datum are now identified. Continuing, a second data response may generate a second data filter for search query, wherein the number of available target datum may drop to 100. Continuing, a third data response may be used to generate an even more narrow search query using data filter wherein the search query may yield only 10 medications and/or target datum. In one or more embodiments, processor 108 may follow a hierarchical model wherein processor and/or LLM may be configured to transmit data requests 144 and continuously create more and more data filters until a desired result is achieved. In one or more embodiments, data filter may be used to identify alternative data entries 180, wherein data filter may be used to filter out target datum that have been identified to be detrimental to a user's health. In one or more embodiments, processor may be configured to receive from the remote device at least one data response as a function of the at least one data request and identify at least one data filter as a function of the data response. In one or more embodiments, processor may then be configured to receive from the validation database, the target data set as a function of the identification data set and the at least one data response by receiving the plurality of alternative data entries as a function of the data filter.

With continued reference to FIG. 1, processor may be configured to generate and/or retrieve target data set 176 using a hierarchical structure as described above. In one or more embodiments, data responses 160 may be used to generate data filters. In one or more embodiments, data filters may be used to narrow the amount of target datum 176 that may be suitable for a user. In one or more embodiments, data filters may be based on location, medical diagnosis, allergic reaction, physiological response and/or the like. In one or more embodiments, search query 168 may include data filters wherein search query may filter out target datum that are not suitable for the user.

With continued reference to FIG. 1, in one or more embodiments, processor 108 may use a machine learning model to generate and/or receive target data set 172. In one or more embodiments, computing device 104 may include a machine learning module to implement one or more algorithms or generate one or more machine-learning models to generate outputs. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from database 116, user inputs and/or be provided by a user. In other embodiments, a machine-learning module may obtain a training set by querying a communicatively connected database 116 that includes past inputs and outputs. Training data may include inputs from various types of databases 116, resources, libraries, dependencies and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements. A machine learning module may be used to create a machine learning model and/or any other machine learning model using training data. Training data may be data sets that have already been converted from raw data whether manually, by machine, or any other method. In some cases, the machine learning model may be trained based on user input. For example, a user may indicate that information that has been output is inaccurate wherein the machine learning model may be trained as a function of the user input. In some cases, the machine learning model may allow for improvements to computing device 104 such as but not limited to improvements relating to comparing data items, the ability to sort efficiently, an increase in accuracy of analytical methods and the like.

With continued reference to FIG. 1, in one or more embodiments, a machine-learning module may be generated using training data. Training data may include inputs and corresponding predetermined outputs so that machine-learning module may use the correlations between the provided exemplary inputs and outputs to develop an algorithm and/or relationship that then allows machine-learning module to determine its own outputs for inputs. Training data may contain correlations that a machine-learning process may use to model relationships between two or more categories of data elements. The exemplary inputs and outputs may come from a database 116 and/or be provided by a user. In other embodiments, machine-learning module may obtain a training set by querying a communicatively connected database 116 that includes past inputs and outputs. Training data may include inputs from various types of databases 116, resources, libraries, dependencies and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories.

With continued reference to FIG. 1, machine learning model may include a target machine learning model. In one or more embodiments, target machine learning model may be configured to receive as an input, identification data set 120 and/or data responses 160 and output target data set 172.

In one or more embodiments, target machine learning model may be trained using target data. In one or more embodiments, target training data may include a plurality of data responses 160 and/or identification data sets 120 correlated to a plurality of target sets and/or target datum 176. In an embodiment, an identification data set 120 and corresponding data response 160 may be associated with one or more target datum 176. In one or more embodiments, target training data may be generated by a user, 3rd party and/or the like. In one or more embodiments, target machine learning model may output an ideal target data set 172, wherein the ideal target data set 172 includes target datum 176 that are most suitable for user. In one or more embodiments, processor 108 may use ideal target data set 172 to query validation database and find the same or similar target datum 176. In one or more embodiments, only similar target datum 176 may be found within validation database. In one or more embodiments, target machine learning model may be used to query database 116 and find target datum 176 that are most suitable for a user.

In one or more embodiments, a machine learning model such as target machine learning model may contain parameter values. "Parameter values" for the purposes of this disclosure are internal variables that a machine learning model has generated from training data in order to make predictions. In one or more embodiments, parameter values may include weights associated with a machine learning model wherein the weights may include coefficients used to calculate outputs for the machine learning model. In one or more embodiments, parameter values may be adjusted during pretraining or training in order to minimize a loss function. In one or more embodiments, during training, predicted outputs of the machine learning model are compared to actual outputs wherein the discrepancy between predicted output and actual outputs are measured in order to minimize a loss function. A loss function also known an "error function" may measure the difference between predicted outputs and actual outputs in order to improve the performance of the machine learning model. A loss function may quantify the error margin between a predicted output and an actual output wherein the error margin may be sought to be minimized during the training process. The loss function may allow for minimization of discrepancies between predicted outputs and actual outputs of the machine learning model. In one or more embodiments, the loss function may adjust parameter values of the machine learning model. In one or more embodiments, in a linear regression model, parameter values may include coefficients assigned to each feature and the bias term. In one or more embodiments, in a neural network, parameter values may include weights and biases associated with the connection between neurons or nodes within layers of the network. In one or more embodiments, during pretraining and/or training of the machine learning model, parameter values of the machine learning model (e.g. target machine learning model) may be adjusted as a function of target training data. In one or more embodiments, target machine learning model may receive inputs within target training data and predict outputs. In one or more embodiments, target machine learning model may adjust parameter values of the machine learning model based on a comparison between predicted outputs and actual outputs contained within target training data. In one or more embodiments, parameter values may be adjusted to minimize a loss function such that a discrepancy between actual outputs and predicted outputs are minimized. In one or more embodiments, processor 108 may be configured to minimize a loss function by adjusting parameter values of target machine learning model based on discrepancies between predicted outputs and actual outputs as indicated within target training data. In one or more embodiments, training target machine learning model may include adjusting one or more parameter values of target machine learning model as a function of a comparison between at least one predicted output and/or predicted target datum 176 contained within target training data. In one or more embodiments, processor 108 may be configured to iteratively train target machine learning model, wherein processor 108 may be configured to iteratively receive feedback from users indicating their adherence to a particular target datum 176 chosen for them. In an embodiment, the more positive feedback received from users may be, the more accurate the target machine learning model may be in predicting future target data sets 172.

With continued reference to FIG. 1, in one or more embodiments, target data set 172 may include one or more data recipients 184. A "data recipient" for the purposes of this disclosure is an individual that may receive data received or generated by processor 108. For example, and without limitation, data recipient 184 may include a physician tasked with overseeing results generated by processor 108. In an embodiment, a physician may oversee generation of data by processor 108, wherein the physician may step in in instances in which data generated may be inaccurate. In one or more embodiments, data recipients 184 may include physicians that may be able to treat user. In one or more embodiments, data recipients 184 may include a pharmacy that is capable of receiving target datum 176, such as a medication refill, and generating the medication refill for the user. In one or more embodiments, data recipients 184 may include pharmacies and/or physicians that are capable of either filling prescriptions and/or prescribing medications based on the selected target data set 172. In one or more embodiments, medications may include chronic medications. In one or more embodiments, processor 108 may be configured to identify pharmacies for chronic medications rather than select them for a user. In one or more embodiments, target data set 172 may include pharmacies that prescribe a specific chronic medication, wherein a user may physically enter the pharmacy with a prescription in hand to receive the medication. In one or more embodiments, a filling of medications may require an in-person pharmacy visit. In one or more embodiments, processor 108 may identify pharmacies in instances in which the medication requires an in-person visit. In one or more embodiments, target datum 176 may include a medication refill and/or additional medication of an already prescribed medication. In one or more embodiments, a user may be requesting a medication refill wherein target datum 176 may include a same or similar medication for the user. In one or more embodiments, system 100 may act as an initial consultation between a user and a virtual physician, wherein a real physician may receive data responses 160 and target sets generated and make medical determinations for the user. In one or more embodiments, each target datum 176 may include a separate data recipient 184, wherein a user may have the ability to select a particular target datum 176 and corresponding data recipient 184. In one or more embodiments, a machine learning model, such as target machine learning model may receive identification data set 120 and/or data response 160 and select data recipients 184 from a plurality of data recipients 184 on database 116. In one or more embodiments, in instances in which target datum 176 may describe a medication, data recipient 184 may indicate the particular pharmacy that carries the medication.

With continued reference to FIG. 1, processor 108 is configured to generate a user interface data structure 156 and/or modify existing user interface data structure 156 as described above. In one or more embodiments, user interface data structure 156 may include information that may be used to configure remote device 128 to visually display target datum 176 on remote device 128. In one or more embodiments, user interface data structure 156 may be transmitted to remote device 128, wherein user interface may be displayed on remote device 128. In one or more embodiments, processor 108 may be configured to configure remote device 128 to generate a graphical view 188 as a function of user interface data structure 156. As used in this disclosure, a "graphical view 188" is a data structure that causes display of one or more graphical elements on a remote device 128 such as first remote device. For example, and without limitation, graphical view 188 may include a visual presentation of graphical elements such as images, texts, icons, shapes and/or the like that are displayed to a user on a screen of remote device 128. In one or more embodiments, graphical elements may include buttons that a user may interact with, textual information and/or the like. In one or more embodiments, graphical view 188 may include information organized within a graphical user interface and configured to facilitate interaction with a graphical user interface. In one or more embodiments, processor 108 may be configured to configure remote device 128 to generate a graphical view 188 within graphical user interface. In one or more embodiments, graphical view 188 may include a single visual representation within an application or system that displays specific graphical elements to the user. In one or more embodiments, graphical view 188 may include medications and/or information within target data set 172 within a graphical format. In one or more embodiments, graphical view 188 may include information within target data set 172 structured within a particular format suitable for user interaction. In one or more embodiments, a graphical user interface may include a plurality of graphical views 188 wherein each graphical view 188 may be generated as a function of information generated by processor 108.

With continued reference to FIG. 1, graphical view 188 may include a display element. A "display element," as used in this disclosure, is an image or set of images that a program or data structure may cause to be displayed on a display of a remote device 128 such as first remote device. Display elements may include, without limitation, windows, pop-up boxes, web browser pages, display layers, and/or any other display element that may occur to a person skilled in the art upon reviewing the entirety of this disclosure. In one or more embodiments, display element may include a virtual avatar 148, a chatbot system 136 and/or the like. In one or more embodiments, graphical view 188 may include display element wherein graphical view 188 may display virtual avatar 148 displayed through GUI. In one or more embodiments, graphical view 188 may include at least a display element 1 generated as a function of target data set 172. In one or more embodiments, display element may be generated as a function of target data set 172 wherein display element may include textual and/or visual information associated with one or more target datum 176 within target data set 172. In one or more embodiments, display element may include images of medications, image of pharmacies, images of data recipients 184 and/or the like. In one or more embodiments, display elements may include images, videos, popup boxes, check boxes, text boxes and/or the like. In one or more embodiments, graphical view 188 may further include a first selectable event graphic 190 corresponding to a first selectable event handler 192. A "selectable event graphic," as used in this disclosure, is a graphical element that, upon selection, is configured to trigger an action to be performed on remote device 128. In one or more embodiments, selection may de done using a cursor or other locater as manipulated using a locater device such as a mouse, touchscreen, trackpad, joystick and/or the like. As a non-limiting example, a selectable event graphic 190 may include a button or checkbox used to select a particular target datum 176 wherein selection of target datum 176 may indicate, for example, selection of a particular medication. In one or more embodiments selectable event graphics 190 may include interactive elements that allow a user to select, through a user interface one or more target datum 176. In one or more embodiments, graphical view 188 may include selectable event graphics 190 that allow a user to interact with GUI.

With continued reference to FIG. 1, selectable event graphic 190 may include graphical elements used to indicate a selection of a target datum 176 within target data set 172. In one or more embodiments, graphical view 188 may include a plurality of selectable event graphics 190 wherein each selectable event graphic 190 may correspond to a particular target datum 176. In one or more embodiments, selection of selectable event graphic 190 may inform processor 108 that a particular target datum 176 has been selected.

With continued reference to FIG. 1, selectable event graphic 190 corresponds to a selectable event handler 192. A "selectable event handler" as described in this disclosure is an event handler associated with selectable event graphic 190. An "event handler," as used in this disclosure, is a module, data structure, function, and/or routine that performs an action on remote device 128 in response to a user interaction with selectable event graphic 190. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements. Event handler may convert data into expected and/or desired formats, for instance such as date formats, currency entry formats, name formats, or the like. Event handler may transmit data from remote device 128 to computing device 104 and/or processor 108. In one or more embodiments, event handler may allow for interaction by an individual with remote device 128. In one or more embodiments, an individual such as a user of remote device 128 may interact with remote device 128 to trigger event handler. In one or more embodiments, user interactions with remote device 128 may include, but are not limited to, the inputting of information, interaction with a user interface and/or the like. In one or more embodiments, event handler may cause processor 108 to perform one or more actions in response to user interactions. In one or more embodiments, event handler may receive selection of a particular target datum 176 and perform one or more actions in response. In one or more embodiments, selectable event handler 192 may be triggered upon interaction and/or selection of selectable event graphic 190. In one or more embodiments, selectable event handler 192 may include instructions to generate data, retrieve data, process information, display information and/or the like. In one or more embodiments, selectable event handler 192 may include instructions to transmit a target datum 176 to an associated data recipient 184. In one or more embodiments, each selectable event handler 192 may be associated with at least one target datum 176. In one or more embodiments selectable event handler 192 may trigger differing actions based on the target datum 176 selected.

With continued reference to FIG. 1, in one or more embodiments, selectable event handler 192 may be configured to trigger event actions 196 upon interaction of selectable event graphic 190. An "event action" as described in this disclosure is an operation or set of operations performed by a computing device 104 in response to an event. In one or more embodiments, event action 196 may include the transmission of information to a data recipient 184. For example and without limitation, event action 196 may include the transmission of a prescription to a pharmacy, wherein the prescription may indicate to give the user a particular medication. In one or more embodiments, event actions 196 may include communications with data recipients 184, such as physicians. In an embodiment, a physician may receive a communication containing identification data set 120 and data response 160, wherein the physician may provide proper care to the user. In one or more embodiments, event actions 196 may include the selection of medications for shipping, the notification to a pharmacy to fill a particular prescription, notification to a physician to view information generated by system 100 about a patient and/or the like. In one or more embodiments, event action 196 may include any action as described in this disclosure. In one or more embodiments, selectable event handler 192 may further trigger event actions 196 such as the selection of an alternative medication for the patient or user to use. In one or more embodiments, selectable event graphic 190 may trigger an action to refill an existing prescription for the user. In one or more embodiments selection of selectable event graphic 190 may trigger an event action 196 to generate a new prescription for the user. In one or more embodiments, selectable event handler 192 may trigger event actions 196 such as for example, generation of responses by LLM 152, generation of responses by virtual avatar 148, the display of information within target datum 176 and/or the like. In one or more embodiments, selectable event handler 192 may be configured to trigger event actions 196 on processor 108.

With continued reference to FIG. 1, event action 196 may be triggered upon interaction of selectable event graphic 190. In one or more embodiments, event action 196 may include preconfigured processes that are to be performed by processor 108. In one or more embodiments, event actions 196 may be used to identify whether an input provided by remote device 128 is correct or incorrect. In one or more embodiments, event action 196 may be triggered upon an input made by remote device 128. In one or more embodiments, input made by remote device 128 may be made by interacting with user interface and/or one or more selectable event graphics 190. In one or more embodiments, event actions 196 may include actions to trigger the display of additional information within target set. In one or more embodiments, event actions 196 may include an operation to communicate with an LLM 152 to generate communications made in response to inputs made by a user. In one or more embodiments, event actions 196 may include operations to communicate with a chatbot system 136 connected to LLM 152. In one or more embodiments, selection of a particular target datum 176 may indicate to LLM 152 to generate information associated with the target datum 176. In one or more embodiments, LLM 152 may be configured to convey to user the medication or data recipient 184 selected, various benefits, various side effects and/or the like. In one or more embodiments, LLM 152 may be configured to provide user with instruction on how to take the medication within target datum 176, similar to that of a physician. In one or more embodiments, processor 108 may be configured to generate a graphical view including one or more selectable event graphics 190 corresponding to one or more selectable event handler 192, wherein each selectable event handler 192 is configured to trigger at least one event action 196 upon interaction of the selectable event graphic 190 and wherein each selectable event handler 192 is associated with at least one target datum 176 within the target data set 172.

Figure 2A:
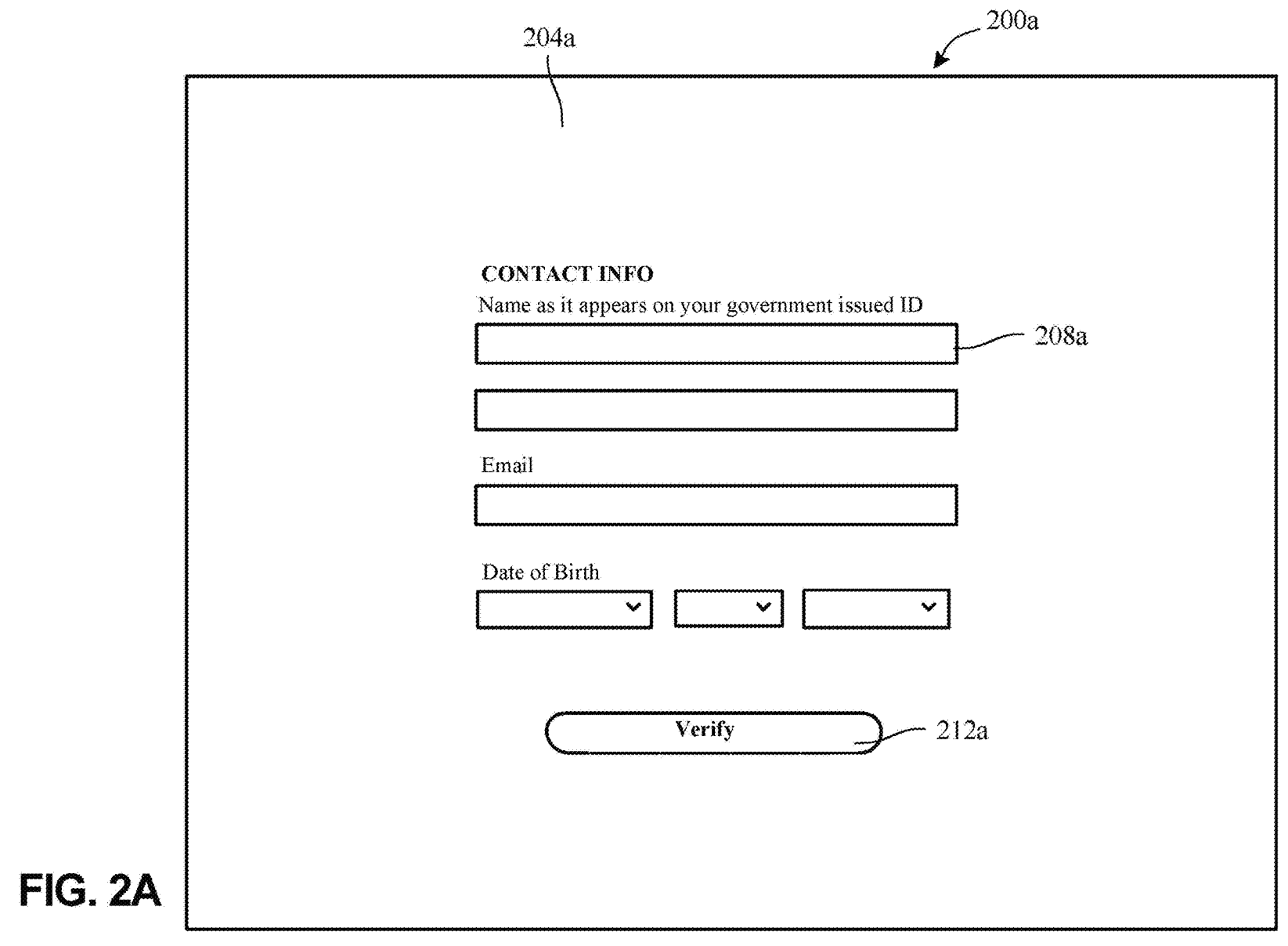

Referring now to FIG. 2A, an exemplary embodiment of a graphical user interface 200a is described. In one or more embodiments, graphical user interface may include a first graphical view 204a. In one or more embodiments, first graphical view may include input boxes 208a used for receiving identification data set as described in reference to FIG. 1. In one or more embodiments, a user may be tasked with inputting information through GUI 200a in order to be verified. In one or more embodiments, GUI 200a may include interactive elements 212a such as push buttons, wherein a user may interact with the interactive elements 212a to signal that interaction data set has been received. In one or more embodiments, GUI 200a may first include first graphical view 204a wherein a user may be tasked with inputting information associated with interactive data set. In one or more embodiments, a computing device as described in reference to at least FIG. 1 may be configured to validate information that has been received in order to determine if a user is eligible for a medication prescription. In one or more embodiments, eligibility may be determined based on the user's residence, whether the user has been a previous patient, whether the user has correct insurance and/or the like.

Figure 2B:
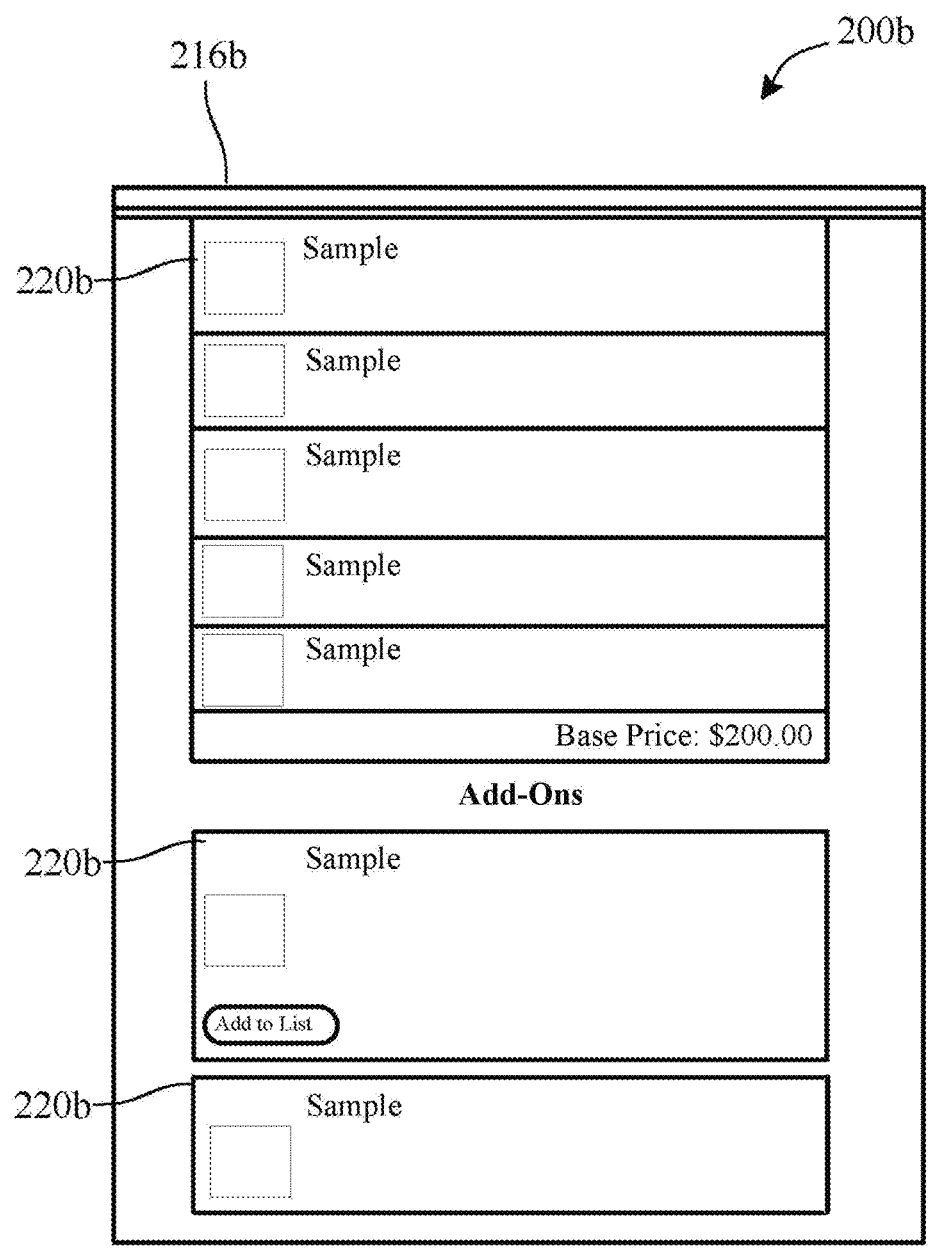

Referring now to FIG. 2B, yet another exemplary embodiment of a graphical user interface 200b is described. In one or more embodiments, GUI 200b may be configured to display second graphical view 216b. In one or more embodiments, second graphical view 216b may be displayed following the receipt of information, such as for example, identification data set, data responses, user communications and/or the like. In one or more embodiments, second graphical view may include one or more selectable event graphics 220b. In one or more embodiments, selectable event graphics may correspond to target datum and/or target data sets as described in reference to at least FIG. 1. In one or more embodiments, each selectable event graphic 220b may correspond to a particular medication. In one or more embodiments, selection of selectable event graphics 220b may cause selectable event handler to trigger an event action. In one or more embodiments, a processor may be configured to receive data response, receive a target data set as a result and generate a graphical view containing a plurality of selectable event graphics 220b corresponding to a plurality of selectable event handlers. In one or more embodiments, the selectable event handlers may be configured to trigger an event actions upon interaction of the selectable event graphic. In one or more embodiments, interaction of the selectable event graphic may include the transmission of the medication to a pharmacy for a refill, the notification to a physician that a patient needs to be seen and/or the like.

Figure 3:
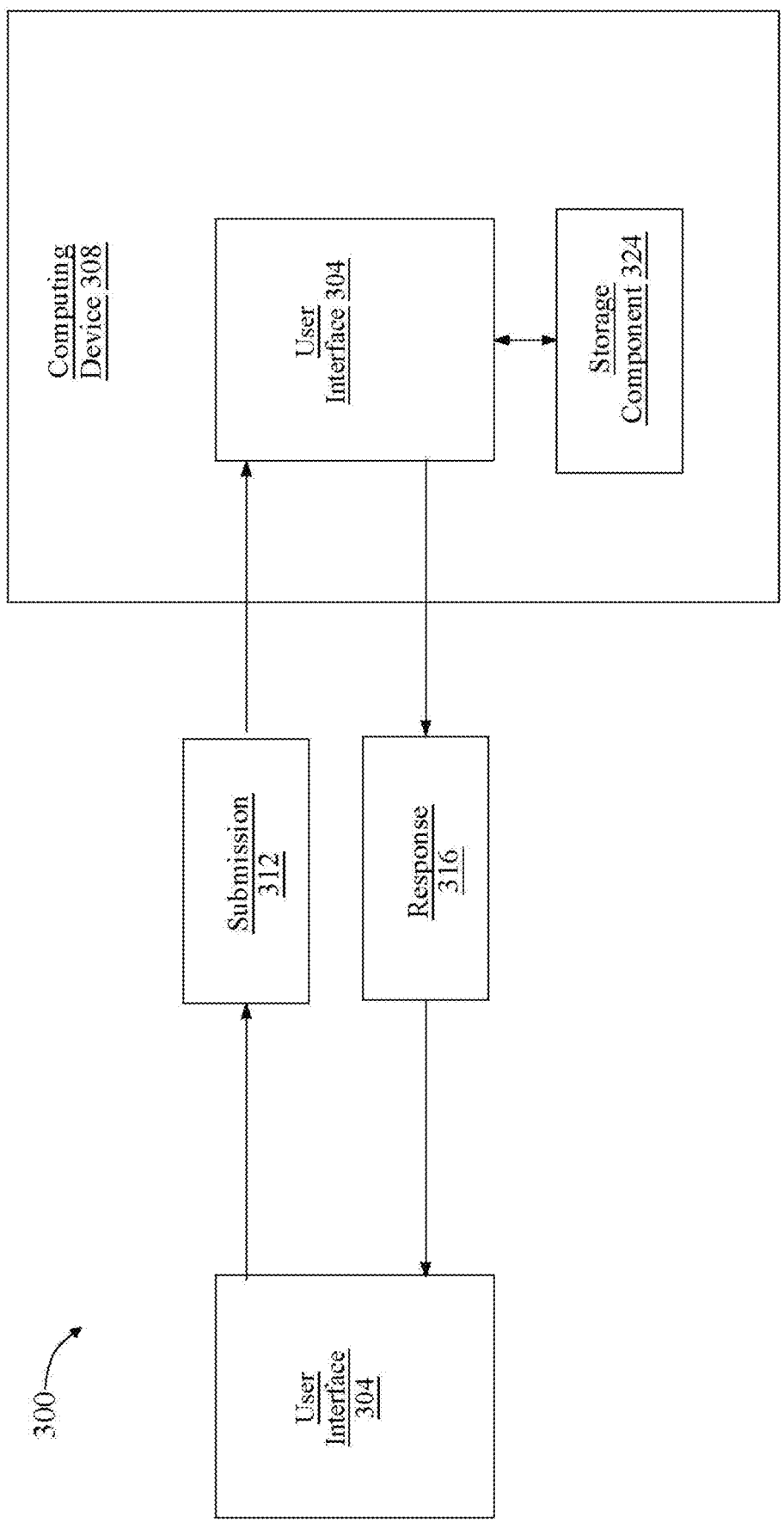
FIG. 3 is a block diagram of exemplary embodiment of a chatbot.

Referring to FIG. 3, a chatbot system 300 is schematically illustrated. According to some embodiments, a user interface 304 may be communicative with a computing device 308 that is configured to operate a chatbot. In some cases, user interface 304 may be local to computing device 308. Alternatively or additionally, in some cases, user interface 304 may remote to computing device 308 and communicative with the computing device 308, by way of one or more networks, such as without limitation the internet. Alternatively or additionally, user interface 304 may communicate with user device using telephonic devices and networks, such as without limitation fax machines, short message service (SMS), or multimedia message service (MMS). Commonly, user interface 304 communicates with computing device 308 using text-based communication, for example without limitation using a character encoding protocol, such as American Standard for Information Interchange (ASCII). Typically, a user interface 304 conversationally interfaces a chatbot, by way of at least a submission 312, from the user interface 304 to the chatbot, and a response 316, from the chatbot to the user interface 304. In many cases, one or both of submission 312 and response 316 are text-based communication. Alternatively or additionally, in some cases, one or both of submission 312 and response 316 are audio-based communication.

Continuing in reference to FIG. 3, a submission 312 once received by computing device 308 operating a chatbot, may be processed by a processor. In some embodiments, processor processes a submission 312 using one or more of keyword recognition, pattern matching, and natural language processing. In some embodiments, processor employs real-time learning with evolutionary algorithms. In some cases, processor may retrieve a pre-prepared response from at least a storage component 324, based upon submission 312. Alternatively or additionally, in some embodiments, processor communicates a response 316 without first receiving a submission 312, thereby initiating conversation. In some cases, processor communicates an inquiry to user interface 304; and the processor is configured to process an answer to the inquiry in a following submission 312 from the user interface 304. In some cases, an answer to an inquiry present within a submission 312 from a user device may be used by computing device 104 as an input to another function, for example without limitation as an input to LLM and/or an input to course module.

Figure 4:
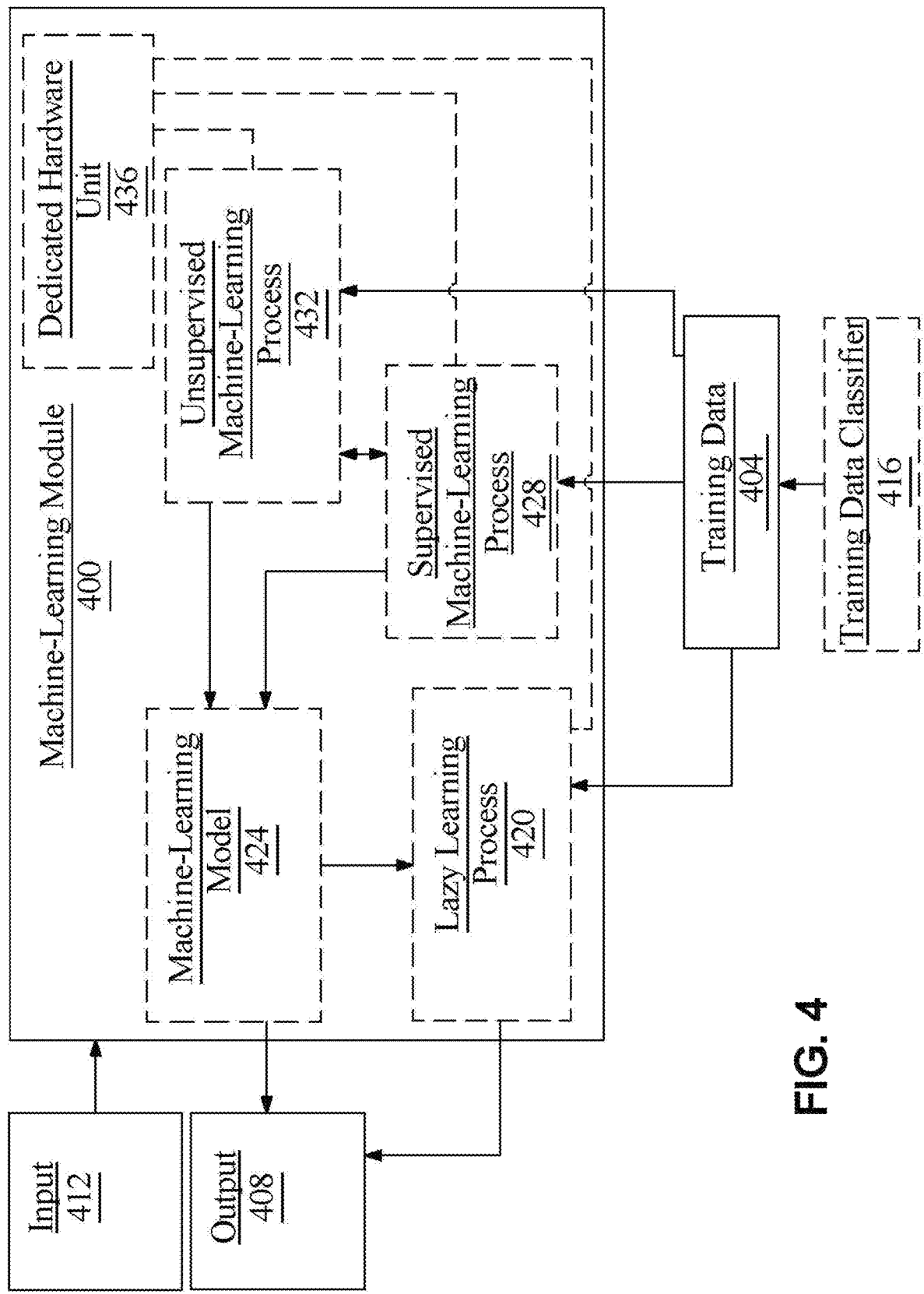
FIG. 4 is a block diagram of exemplary embodiment of a machine learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include inputs such as data responses and/or identification data set and outputs may include outputs such as target data set and/or target datum.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to classes of medications or illnesses such as for example, heart disease, diabetes, weight loss, thyroid and/or the like.

Still referring to FIG. 4, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B) = P(B/A) P(A) = P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 4]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include identification data set and/or data response as described above as inputs, target data set as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods.

Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
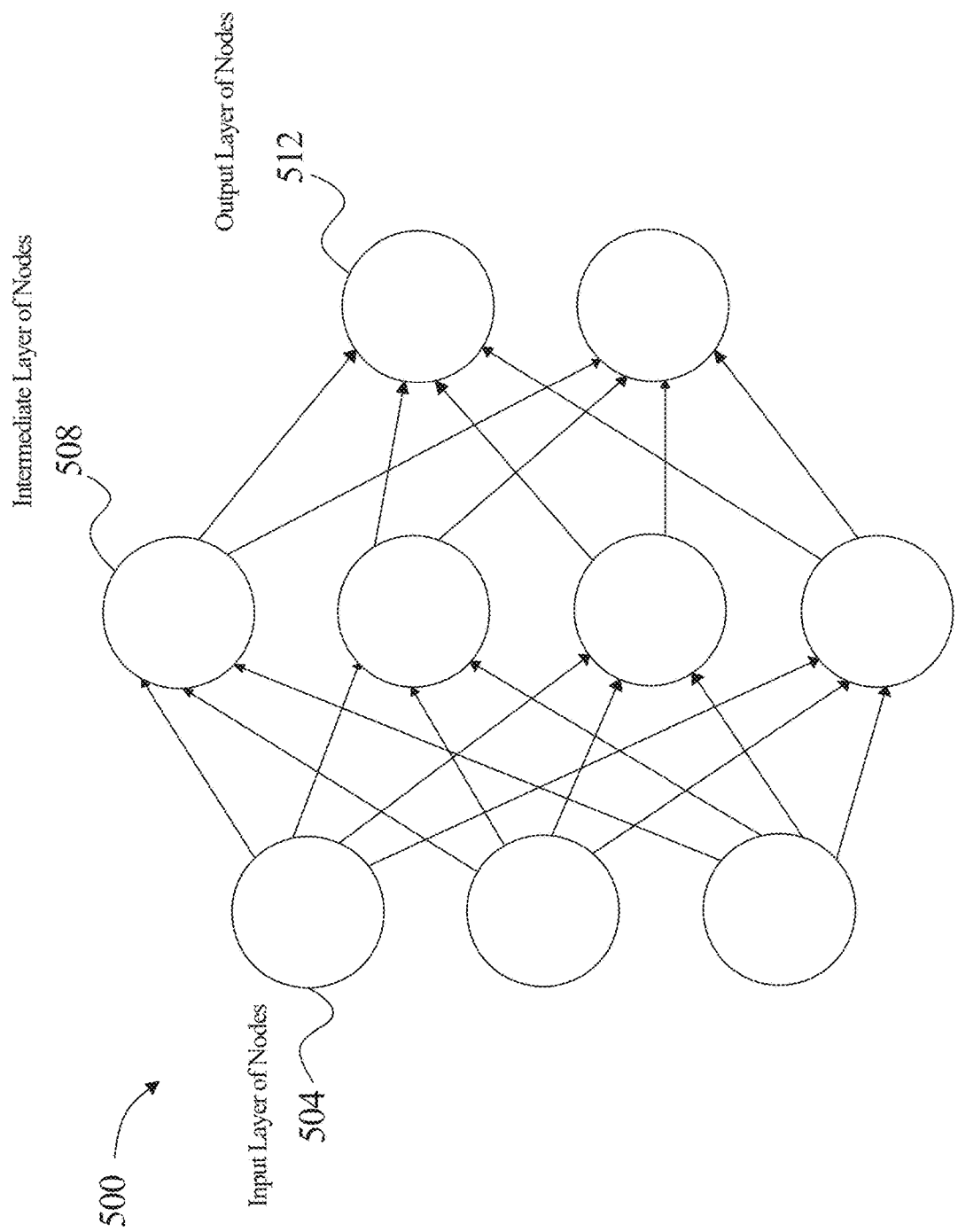
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
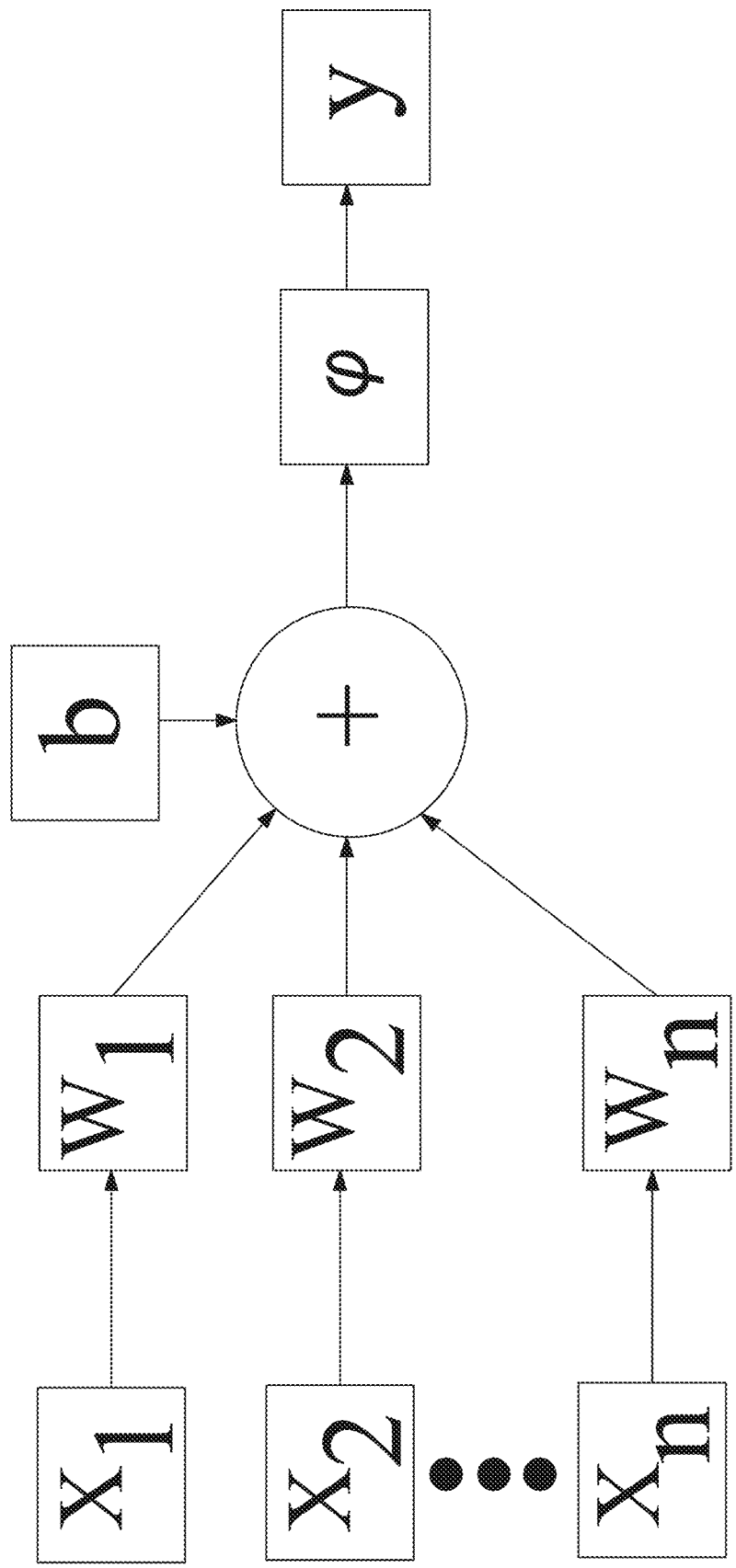
FIG. 6 is a block diagram of an exemplary embodiment of a node of a neural network.

Referring now to FIG. 6, an exemplary embodiment of a node 600 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/T}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs x; that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
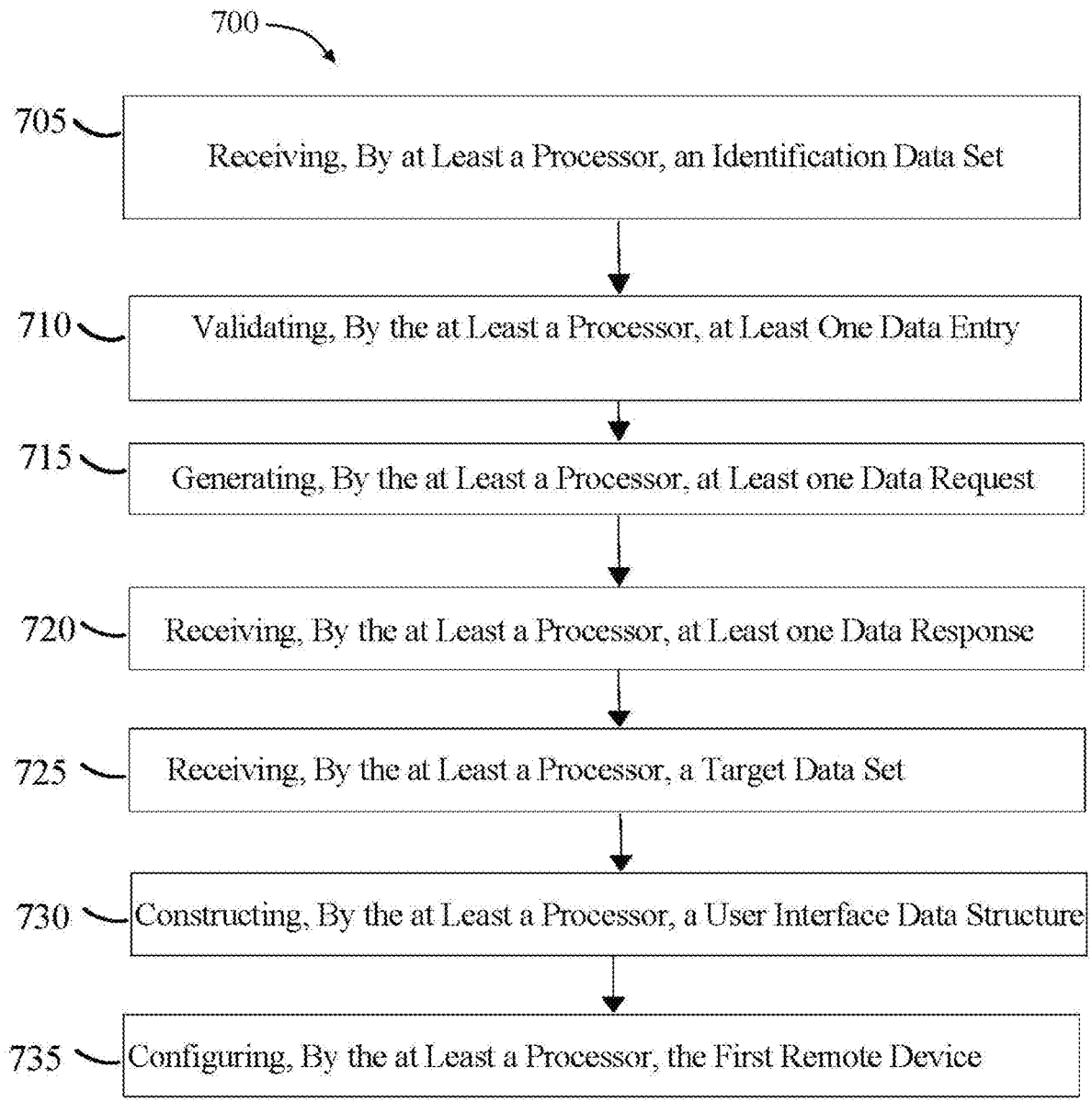
FIG. 7 is a flow diagram illustrating an exemplary embodiment of a method for dynamically updating data for course generation.

Referring now to FIG. 7, a method 700 for validation of data entries for user interface data sets is described. At step 705, method 700 includes receiving, by at least a processor, an identification data set comprising a plurality of data entries from a first remote device. In one or more embodiments, the identification data set includes an electronic condition file associated with a user. This may be implemented with reference to FIGS. 1-6 and without limitation.

With continued reference to FIG. 7, at step 710 method 700 includes validating, by the at least a processor, at least one data entry of the plurality of data entries by comparing the identification data set to at least one encrypted datum. In one or more embodiments, validating, by the at least a processor, the at least one data entry of the plurality of data entries includes identifying a corresponding electronic condition file associated with a user on an electronic file database and validating the at least one data entry as a function of the identification. In one or more embodiments, the encrypted datum includes a geographic constraint. This may be implemented with reference to FIGS. 1-6 and without limitation.

With continued reference to FIG. 7, at step 715 method 700 includes generating, by the at least a processor, at least one data request as a function of the validation. This may be implemented with reference to FIGS. 1-6 and without limitation.

With continued reference to FIG. 7, at step 720 method 700 includes receiving, by the at least a processor and from the first device, at least one data response as a function of the at least one data request. In one or more embodiments, receiving, by the at least a processor and from the first device, at least one data response as a function of the at least one data request includes transmitting the at least one data request to the first remote device using a chatbot system and receiving from the chatbot system the at least one data response. In one or more embodiments, receiving from the chatbot system the at least one data response includes receiving, a user communication through the chatbot system from the remote device, transmitting the user communication to a large language model and receiving the at least one data response from the large language model, wherein the at least one data response comprises a search query for the validation database. In one or more embodiments, receiving, by the at least a processor and from the first device, at least one data response as a function of the at least one data request includes receiving a first user communication from the first remote device in response to the at least one data request, generating a second data request as a function of the user communication and the first data request using a large language model, transmitting the second data request to the first remote device and receiving a second user communication from the first remote device in response to the second data request wherein that least one data response comprises the first user communication and the second user communication. In one or more embodiments, generating the second data request as a function of the user communication and the first data request using a large language model includes generating the second data request as a function of at least one ailment within the first user communication. This may be implemented with reference to FIGS. 1-6 and without limitation. In one or more embodiments, receiving from the chatbot system the at least one data response includes receiving, a user communication through the chatbot system from the remote device, transmitting the user communication to a large language model and receiving the at least one data response from the large language model, wherein the at least one data response includes a search query for the validation database. In one or more embodiments, receiving from the validation database, the target data set as a function of the identification data set and the at least one data response includes querying the validation database using the search query and receiving the target data set as a function of the search query. This may be implemented with reference to FIGS. 1-6 and without limitation.

With continued reference to FIG. 7, at step 725 method 700 includes receiving, by the at least a processor, from a validation database, a target data set as a function of the identification data set and the at least one data response. In one or more embodiments, the target data set includes a plurality of alternative data entries and wherein at least one alternative data entry is configured to replace at least one data entry of the plurality of data entries in the identification data set. In one or more embodiments, the target data set includes one or more data recipients. This may be implemented with reference to FIGS. 1-6 and without limitation.

With continued reference to FIG. 7, at step 730 method 700 includes constructing, by the at least a processor, a user interface structure as a function of the target data set. This may be implemented with reference to FIGS. 1-6 and without limitation.

With continued reference to FIG. 7, at step 735 method 700 includes configuring, by the at least a processor, the first remote device to generate a graphical view as a function of the user interface data structure, wherein the graphical view includes one or more selectable event graphics corresponding to one or more selectable event handlers, wherein each selectable event handler is configured to trigger at least one event action upon interaction of the selectable event graphic and wherein each selectable event handler is associated with at least one target datum within the target data set. In one or more embodiments, receiving, by the at least a processor and from the first device, the at least one data response as a function of the at least one data request includes identifying at least one data filter as a function of the data response and receiving, by the at least a processor, from the validation database, the target data set as a function of the identification data set and the at least one data response includes receiving the plurality of alternative data entries as a function of the data filter. This may be implemented with reference to FIGS. 1-6 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
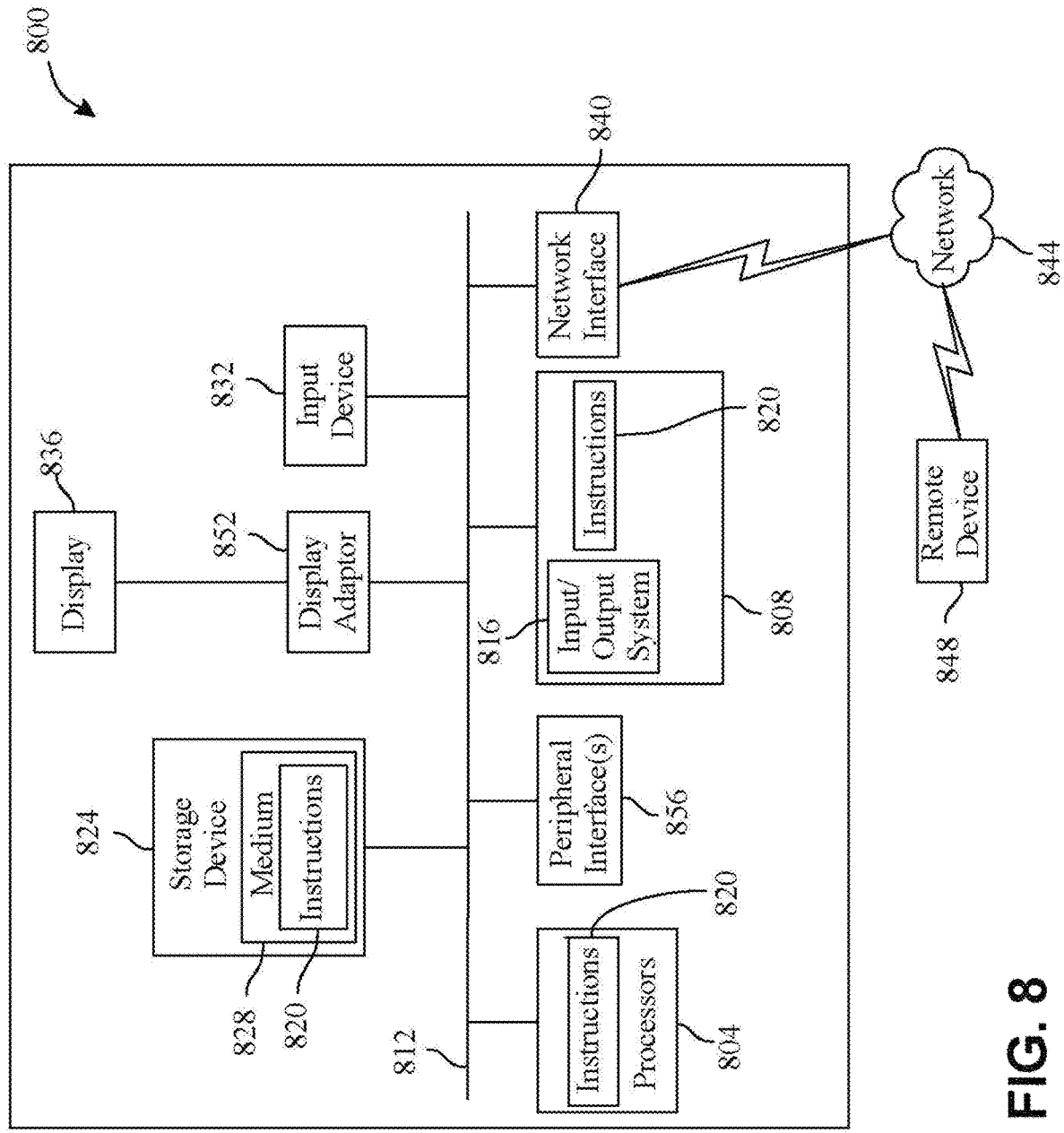
FIG. 8 is a block diagram of a computing system that can be used to implement any one or more of the methodologies disclosed herein and any one or more portions thereof. The drawings are not necessarily to scale and may be illustrated by phantom lines, diagrammatic representations and fragmentary views. In certain instances, details that are not necessary for an understanding of the embodiments or that render other details difficult to perceive may have been omitted.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for validation of data entries for user interface data sets, the system comprising:
   at least a processor; and
   a memory communicatively connected to the at least a processor, the memory containing instructions configuring the at least a processor to:
   receive an identification data set comprising a plurality of data entries from a first remote device;
   validate at least one data entry of the plurality of data entries by comparing the identification data set to at least one datum, wherein the at least one datum comprises an electronic health record of a patient;
   generate at least one data request as a function of the validation;
   receive from the first remote device, at least one data response as a function of the at least one data request;
   receive from a validation database, a target data set as a function of the identification data set and the at least one data response, wherein the target data set comprises one or more data recipients;
   construct a user interface data structure as a function of the target data set;
   configure the first remote device to generate a graphical view as a function of the user interface data structure, wherein the graphical view includes:
   one or more selectable event graphics corresponding to one or more selectable event handlers, wherein each selectable event handler is configured to trigger at least one event action upon interaction of the selectable event graphic and wherein each selectable event handler is associated with at least one target datum within the target data set; and
   transmit the at least one data request to a second remote device as a function of the triggered at least one event action.

2. The system of claim 1, wherein the identification data set comprises an electronic condition file associated with a user.

3. The system of claim 1, wherein validating the at least one data entry of the plurality of data entries comprises:
   identifying a corresponding electronic condition file associated with a user on an electronic file database; and
   validating the at least one data entry as a function of the identification.

4. The system of claim 1, wherein the datum comprises a geographic constraint.

5. The system of claim 1, wherein receiving from the first remote device, at least one data response as a function of the at least one data request comprises:
   transmitting the at least one data request to the first remote device using a chatbot system; and
   receiving from the chatbot system the at least one data response.

6. The system of claim 5, wherein:
   receiving from the chatbot system the at least one data response comprises:
   receiving, a user communication through the chatbot system from the first remote device;
   transmitting the user communication to a large language model; and
   receiving the at least one data response from the large language model, wherein the at least one data response comprises a search query for the validation database; and
   receiving from the validation database, the target data set as a function of the identification data set and the at least one data response comprises:
   querying the validation database using the search query; and
   receiving the target data set as a function of the search query.

7. The system of claim 1, wherein receiving from the first device, at least one data response as a function of the at least one data request comprises:
   receiving a first user communication from the first remote device in response to the at least one data request;
   generating a second data request as a function of the user communication and the first data request using a large language model;
   transmitting the second data request to the first remote device; and
   receiving a second user communication from the first remote device in response to the second data request wherein that least one data response comprises the first user communication and the second user communication.

8. The system of claim 1, wherein the target data set comprises a plurality of alternative data entries and wherein at least one alternative data entry is configured to replace at least one data entry of the plurality of data entries in the identification data set.

9. The system of claim 8, wherein:
   receiving from the first device, the at least one data response as a function of the at least one data request comprises identifying at least one data filter as a function of the data response; and
   receiving from the validation database, the target data set as a function of the identification data set and the at least one data response comprises receiving the plurality of alternative data entries as a function of the data filter.

10. The system of claim 1, wherein the target data set comprises one or more data recipients.

11. A method for validation of data entries for user interface data sets, the method comprising:

receiving, by at least a processor, an identification data set comprising a plurality of data entries from a first remote device;

validating, by the at least a processor, at least one data entry of the plurality of data entries by comparing the identification data set to at least one datum, wherein the at least one datum comprises an electronic health record of a patient;

generating, by the at least a processor, at least one data request as a function of the validation;

receiving, by the at least a processor and from the first device, at least one data response as a function of the at least one data request;

receiving, by the at least a processor, from a validation database, a target data set as a function of the identification data set and the at least one data response, wherein the target data set comprises one or more data recipients;

constructing, by the at least a processor, a user interface structure as a function of the target data set;

configuring, by the at least a processor, the first remote device to generate a graphical view as a function of the user interface data structure, wherein the graphical view includes:
   one or more selectable event graphics corresponding to one or more selectable event handlers, wherein each selectable event handler is configured to trigger at least one event action upon interaction of the selectable event graphic and wherein each selectable event handler is associated with at least one target datum within the target data set; and transmitting, by the at least a processor, the at least one data request to a second remote device as a function of the triggered at least one event action.

12. The method of claim 11, wherein the identification data set comprises an electronic condition file associated with a user.

13. The method of claim 11, wherein validating, by the at least a processor, the at least one data entry of the plurality of data entries comprises:
   identifying a corresponding electronic condition file associated with a user on an electronic file database; and
   validating the at least one data entry as a function of the identification.

14. The method of claim 11, wherein the datum comprises a geographic constraint.

15. The method of claim 11, wherein receiving, by the at least a processor and from the first device, at least one data response as a function of the at least one data request comprises:
   transmitting the at least one data request to the first remote device using a chatbot system; and
   receiving from the chatbot system the at least one data response.

16. The method of claim 15, wherein:
receiving from the chatbot system the at least one data response comprises:
   receiving, a user communication through the chatbot system from the first remote device;
   transmitting the user communication to a large language model; and
   receiving the at least one data response from the large language model, wherein the at least one data response comprises a search query for the validation database; and
receiving, by the at least a processor, from the validation database, the target data set as a function of the identification data set and the at least one data response comprises:
   querying the validation database using the search query; and
   receiving the target data set as a function of the search query.

17. The method of claim 11, wherein receiving, by the at least a processor and from the first device, at least one data response as a function of the at least one data request comprises:
   receiving a first user communication from the first remote device in response to the at least one data request;
   generating a second data request as a function of the user communication and the first data request using a large language model;
   transmitting the second data request to the first remote device; and
   receiving a second user communication from the first remote device in response to the second data request wherein that least one data response comprises the first user communication and the second user communication.

18. The method of claim 11, wherein the target data set comprises a plurality of alternative data entries and wherein at least one alternative data entry is configured to replace at least one data entry of the plurality of data entries in the identification data set.

19. The method of claim 18, wherein:
receiving, by the at least a processor and from the first device, the at least one data response as a function of the at least one data request comprises identifying at least one data filter as a function of the data response; and
receiving, by the at least a processor, from the validation database, the target data set as a function of the identification data set and the at least one data response comprises receiving the plurality of alternative data entries as a function of the data filter.

20. The method of claim 11, wherein the target data set comprises one or more data recipients.

* * * * *